US012802958B2

(12) United States Patent
Hartmer et al.

(10) Patent No.: US 12,802,958 B2
(45) Date of Patent: Nov. 17, 2026

(54) COLLISIONAL ACTIVATION IN ION GUIDES

(71) Applicant: Thermo Fisher Scientific (Bremen) GmbH, Bremen (DE)

(72) Inventors: Ralf Günter Hartmer, Bremen (DE); Frederik Busse, Bremen (DE)

(73) Assignee: Thermo Fisher Scientific (Bremen) GmbH, Bremen (DE)

( * ) Notice: Subject to any disclaimer, the term of this patent is extended or adjusted under 35 U.S.C. 154(b) by 364 days.

(21) Appl. No.: 18/509,080

(22) Filed: Nov. 14, 2023

(65) Prior Publication Data

US 2024/0162025 A1 May 16, 2024

(30) Foreign Application Priority Data

Nov. 15, 2022 (GB) ..................................... 2217041

(51) Int. Cl.
*H01J 49/06* (2006.01)
*H01J 49/00* (2006.01)

(52) U.S. Cl.
CPC ........ *H01J 49/066* (2013.01); *H01J 49/0027* (2013.01); *H01J 49/004* (2013.01)

(58) Field of Classification Search
CPC ........ H01J 49/06; H01J 49/062; H01J 49/065; H01J 49/066; H01J 49/0027; H01J 49/004
See application file for complete search history.

(56) References Cited

U.S. PATENT DOCUMENTS 8,581,181 B2 * 11/2013 Giles ..................... H01J 49/065 250/282
2011/0127417 A1 * 6/2011 Ibrahim ................ H01J 49/004 250/282
2012/0223244 A1 * 9/2012 Welkie .................... H01J 49/22 250/396 ML
2014/0103206 A1 4/2014 Mukaibatake et al.
2014/0145095 A1 * 5/2014 McLuckey ............ H01J 49/005 250/489
2017/0148620 A1 * 5/2017 Nishiguchi ............. H01J 49/24
2020/0185209 A1 * 6/2020 Cui ....................... H01J 49/105
2021/0287893 A1 * 9/2021 Green ................... H01J 49/068
2022/0254619 A1 * 8/2022 Collings ............. H01J 49/0031

FOREIGN PATENT DOCUMENTS

GB 2574328 A * 12/2019 ........... H01J 49/005

OTHER PUBLICATIONS

Combined Search and Examination Report under Sections 17 & 18(3) for related GB Application No. 2217041.9 dated May 25, 2023, 7 pages.

* cited by examiner

*Primary Examiner* — David E Smith
(74) *Attorney, Agent, or Firm* — Klarquist Sparkman, LLP

(57) ABSTRACT

A method for ion activation in an ion guide that comprises a first section and a second section, the second section having a longitudinal axis, the method comprising steps of: receiving ions into the first section of the ion guide at a trajectory that is offset from the longitudinal axis; applying a DC potential gradient in the first section along a dimension that is at a non-zero angle to the longitudinal axis to direct the ions towards the second section and to cause ion activation; and applying an RF field in the second section of the ion guide to confine the ions to the ion guide.

21 Claims, 9 Drawing Sheets

COLLISIONAL ACTIVATION IN ION GUIDES

CROSS REFERENCE TO RELATED APPLICATIONS

This application claims priority from Great Britain Application No. 2217041.9, filed on Nov. 15, 2022, which is incorporated herein by reference in its entirety.

FIELD

The disclosure relates generally to mass spectrometry and methods of mass spectrometry, more specifically to a method of ion activation in an ion guide and an ion guide for ion activation.

BACKGROUND

Ion guides are used in mass spectrometers to, amongst other things, transmit ions from an ion source (which can operate at atmospheric pressure) to a mass analyser (which is typically operated under high vacuum, which is generally 1E−4 mbar or below). Mass spectrometers often include a series of differentially pumped vacuum chambers, with each chamber including one or more ion guides configured to transmit ions through that chamber.

The ion guide(s) within the initial chamber of the series of chambers are used to (i) efficiently collect ions from the ion source and subsequently transmit them to the next vacuum chamber (typically via an orifice), and also (ii) separate the collected ions from unwanted neutral molecules, solvent clusters, and droplets that enter the chamber alongside the ions and are prone to cause contamination and other adverse effects, and (iii) remove undesired non-covalently bound adducts and ion-neutral clusters from the spectrum via ion activation.

In a mass spectrometer, pressure is commonly reduced across a series of differential pumping stages, wherein in a first step, ions enter from an atmospheric pressure region into the first sub-ambient region through a heated capillary or transfer tube which aids in ion desolvation. Several approaches exist to collect the ions exiting this capillary and to guide them through the orifice leading to the subsequent differential pumping stage. Most instruments today employ an ion transport device with stacked ring electrodes, which are arranged in the fore vacuum chamber of the ion supply system for ion transportation and ion focusing, called a stacked ring ion guide (SRIG). The most prominent design is the ion funnel, which is comprised of a stack of radio-frequency (RF) electrodes having apertures that progressively decrease in diameter towards a final aperture which limits gas-conductance into the next stage of differential pumping. Adjacent electrodes are driven by an RF waveform with opposite sign to confine ions radially and prevent their loss to the electrodes. In other words, one set of electrodes has an RF waveform applied to it, while a second set of electrodes has an RF waveform having the same frequency but 180 degrees out of phase to the first RF waveform. Usually a static or direct current (DC) gradient is applied along the device axis to create a driving force for ions to be transported through the funnel. This arrangement yields a high ion acceptance area, while keeping the aperture restricting the gas flow small.

There are a number of alternative designs. One such alternative is a stacked ring ion guide comprised of RF electrodes with constant inner diameter but progressively larger distances between the electrodes towards the exit (such as discussed in US 2008/0308721), which is easier to manufacture due to the reduced number of unique parts. Another alternative is the combination of two sections of constant aperture SRIGS, where the second section has a smaller inner diameter than the first, which promotes additional ion focusing after ions are sufficiently cooled and confined in the first section. Alternatively, a combination of a section of constant aperture stacked ring electrodes with constant spacing in which ions are collisionally cooled and roughly radially confined, called an ion tunnel, may be provided, with a subsequent ion funnel which focuses the ion beam down further.

There are several alternatives to such SRIG devices to improve ion transmission in the high-pressure interface region of the mass spectrometer, although they are less commonly used. For example, segmented multipoles and tapered multipoles serve a similar purpose. Planar RF electrodes can also be used to create a radially or laterally confining potential and might be easier to manufacture than stacked ring electrodes (such as described in U.S. Pat. No. 10,332,723).

The SRIG and multipole devices discussed above may be termed ‘ion collecting devices’ to reflect their large ion acceptance area as compared to a skimmer orifice. While ion collecting devices help to significantly improve ion transmission and thus to reduce the gas load on the subsequent pumping stage by decreasing the size of the inlet orifice, it is desirable to find configurations of such devices that reduce the gas flow even further. To prevent the formation of a direct gas jet between the inlet capillary and the funnel exit, it is possible to position the inlet capillary slightly offset (such as described in US 2016/0260594), or at a small angle to the axis of the ion collecting device, or orthogonally to it. Other implementations include the combination of two distinct ion guides, positioned either at an angle (such as discussed in U.S. Pat. No. 8,324,565) or offset laterally (such as in U.S. Pat. No. 8,581,181) with respect to each other, again to prevent neutral molecules from passing straight through. Two ion guides may also be laterally offset and stacked in parallel to form a conjoined ion guide (such as in U.S. Pat. No. 8,581,18).

The internal ion temperature, or the amount of cluster and adduct formation, is usually controlled by using a certain amount of in-source collision induced dissociation (CID) in an intermediate pressure region between the inlet capillary and the first mass analyser (for example, a quadrupole). Although in-source fragmentation occurs at relatively high pressures (around 0.1-10 mbar) as compared to the low pressure typical for collision chambers of tandem mass spectrometry (MS/MS), the resulting fragment spectra are usually similar. This means that pseudo MS2 (also called All Ion Fragmentation) or MS3 spectra can potentially be produced without the need for more expensive instrumentation, such as additional mass analysers or a dedicated collision cell.

However, to achieve reproducible collision energies, conditions in the activation region, in particular the background gas pressure, need to be sufficiently well controlled. Therefore, on most commercial devices, in-source CID is not used for pseudo MS2. An on-axis potential drop is applied, for instance between the inlet capillary and a skimmer (such as in the iFunnel® interface produced by Agilent Technologies, Inc.), between the SRIG or funnel exit lens and the first transport multipole (such as in the Orbitrap Exploris®), or between a funnel exit lens and a skimmer, potentially followed by another ion funnel (such as in the Apollo II ESI source). Ions are accelerated by the resulting static electric field along their direction of travel, which leads to collisions with the background gas molecules. However, this mode of ion activation invariably causes a large spread of the ions' kinetic energy (depending on the mass, charge, and size of the ions and the amount of energy converted into internal temperature or fragmentation) so that the subsequent ion optic needs to have a rather large acceptance area to prevent transmission loss. The effect is further exacerbated if ion activation occurs in a drift region without a radially confining RF potential.

One way to combat this ion loss is to perform fragmentation inside an ion collecting device, as these devices are made to accept ions with a wide range of kinetic energies, a wide mass range, and with a large spatial spread. This also reduces the transmission of neutral fragments and adduct molecules released during collisional activation, which are removed in a section of the instrument which is less prone to contamination and charging. For example, when using multiple ion funnels in sequence, ion activation can be induced by applying a potential difference between the exit of the first and the entrance of the second.

As an alternative to a dedicated stage for in-source CID as described above, ion activation can be controlled to some degree within an ion collecting device itself by increasing the radio frequency (RF) voltage along the ion guide axis above the minimum level required for ion transmission. However, because this shifts the transmitted mass range (in particular, losing ions and fragments with low m/z at high RF voltage), the feasible amount of activation in this region is insufficient for many applications. Moreover, these devices are usually designed such that the RF field amplitude on the ion axis vanishes. Only ions in the vicinity of the RF electrodes will experience significant RF heating, which limits the fraction of ions passing through the device that will be subject to activation.

US 2011/0127417 describes a system and method for collisional activation of charged particles. Ion activation is performed inside segments of a quadrupole. In RF-heating mode, ions are radially displaced from the ion channel axis inside the collision cell using a dipolar DC-displacement pulse within a segment of the quadrupole. The larger the displacement, the larger the amplitude of ion oscillation in the RF field of the quadrupole, resulting in higher energy collisions with the background gas, and an increase in the ion temperature. Radially displaced fragment ions are then focused back to the ion channel axis by removing the DC-displacement pulse. FIG. 1 of US 2011/0127417 indicates that the ions enter along the ion axis channel initially, but may then be displaced in the first section of the ion guide by the DC pulse (as shown in FIG. 5c of US 2011/0127417). Therefore, in US 2011/0127417, neutral molecules would pass straight through the ion guide, resulting in contamination of the mass spectrometer components and signal deterioration. Furthermore, the device adds significant spatial footprint and cost.

US 2021/0287893 describes controlling ion temperature in an ion guide by applying an orthogonal DC field along a portion of an ion guide. In US 2021/0287893, ions enter along the axis of the ion guide. Therefore, neutral molecules pass straight through the ion guide, resulting in contamination of the mass spectrometer components and signal deterioration. Additionally, US 2021/0287893 utilizes three sections of an ion guide assembly for controlling the ion temperature, which requires a larger overall length of the ion guide. Thus, the ion guide assembly has a large spatial footprint.

US 2016/0260594 describes a dual ion funnel design having a laterally offset inlet stream. The use of a laterally offset inlet allows neutral particles, charged solvent clusters and particulates from the inlet stream to strike the focusing plates of the first ion funnel and be pumped away by a vacuum pump. US 2016/0260594 only describes that ions are focused by the ion funnel. There is only limited control over the ion trajectory inside the second ion funnel, as the lateral offset of the inlet is fixed relative to the funnel entrance.

U.S. Pat. No. 8,581,181 describes an ion guiding device comprising a first ion guide that is conjoined with a second ion guide. Ions are directed into the second ion guide by a DC potential gradient. There is only limited control over the ion trajectory inside the second ion guide. Furthermore, the design of the ion guide requires a complex alignment of the two RF ion guides and requires a large overall length of the ion guide.

U.S. Pat. No. 8,698,075 describes an ion guide having an inlet that introduces ions into the ion guide at an angle orthogonal to the ion guide axis. U.S. Pat. No. 8,698,075 states that this improves ion transmission efficiency while minimising contamination of downstream components. The ion guide of U.S. Pat. No. 8,698,075 has a DC repeller electrode and DC fields direct ions through the ion guide along an axis into downstream components. There is no mention of using this device for ion activation. Also, having the repeller electrode in line with the inlet capillary means the electrode is prone to contamination by droplets and clusters, which can affect the ion trajectory and thus the amount of activation. There is only limited control over the ion trajectory in the ion funnel.

U.S. Pat. No. 8,324,565 describes an interface for use in a mass spectrometer. The interface comprises a first ion funnel comprising a first inlet and a first outlet, and a first axis between the first inlet and the first outlet. The interface further comprises a second ion funnel in tandem with the first ion funnel, the second ion funnel comprising a second inlet and a second outlet, and a second axis between the second inlet and the second outlet. The first axis and the second axis are offset relative to one another. However, U.S. Pat. No. 8,324,565 only provides limited control over the ion trajectory in the first and second ion funnels. Furthermore, the design of the two subsequent ion funnels leads to a larger overall length of the ion guide.

Therefore, a method and system that overcomes these issues is desirable.

SUMMARY

Against this background, there is provided a method and ion guide for ion activation. Additional aspects of the invention appear in the description and claims.

In accordance with a first aspect, there is a method for ion activation in an ion guide that comprises a first section and a second section, the second section having a longitudinal axis, the method comprising steps of:

- receiving ions into the first section of the ion guide at a trajectory that is offset from the longitudinal axis;
- applying a DC potential gradient in the first section along a dimension that is at a non-zero angle to the longitudinal axis to direct the ions towards the second section and to cause ion activation; and
- applying an RF field in the second section of the ion guide to confine the ions to the ion guide.

The DC potential gradient may be provided by an arcuate DC electrode that is continuous along the first section, or first and second sections, of the ion guide. In other words, the DC electrode may be a single electrode, rather than stacked electrodes.

The method may enable ion-neutral separation, ion collection, and ion activation in a single device. Furthermore, these tasks can be achieved with a minimal level of complexity of the electrode geometry and required electronics while maintaining a high level of ion transmission.

Preferably, the method may further comprise a step of applying a DC and/or RF field that at least partially cancels the DC potential gradient. At least partially cancelling the DC potential gradient may mean reducing the magnitude of the DC potential gradient. The at least partially cancelling RF field may be the RF field of the second section. A DC and/or RF field that at least partially cancels the DC potential gradient may allow deceleration of the ions to aid in guiding the ions into the second section of the device. Thus, finer control of the ion trajectory into the second section can be provided. This in turn may allow for controlled/selective ion activation by being able to direct the ions closer to the RF electrodes of the second section to induce RF heating, or to direct the ions along the longitudinal axis when a reduced- or non-ion activation mode is desired.

Preferably, the offset trajectory may be provided by receiving the ions from an ion inlet offset from the longitudinal axis, wherein the offset is a lateral and/or non-zero angular offset. Providing an ion inlet offset from the longitudinal axis may prevent the formation of a direct gas jet between the inlet and the funnel exit. Thus, neutral molecules and adduct molecules in the gas jet can be separated from the ions in a straightforward manner.

Optionally, the first and second sections may be sections in a single ion funnel. An ion guide having a reduced spatial footprint that is capable of ion-neutral separation, ion collection, and ion activation may therefore be provided.

Optionally, the offset trajectory may be provided by a displacement of a lengthwise axis of the first section from the longitudinal axis, wherein the displacement is a lateral and/or non-zero angular displacement. Providing the offset trajectory in this manner may provide more space for neutral molecules and adduct molecules in a gas jet to be separated from the ions, for example, via an exhaust port.

Optionally, the ion guide may comprise two distinct ion funnels. Thus, a device capable of ion-neutral separation, ion collection, and ion activation having a simple configuration may be manufactured. Alternatively, the first and second sections may be sections of a conjoined ion funnel. A conjoined ion funnel may provide more space for neutral molecules and adduct molecules in a gas jet to be separated from the ions.

Preferably, the dimension along which the DC potential gradient is applied may be orthogonal to the longitudinal axis of the second section. The DC potential gradient being along a dimension orthogonal to the longitudinal axis may mean that maximum ion activation can be achieved by collisions with a background gas. The DC potential being along the orthogonal dimension may also provide more precise control of the ion trajectory into the second section.

Preferably, the method may further comprise a step of varying the DC potential gradient to cause ion activation by increasing the kinetic energy of the ions and/or by changing a location and direction of the ions as they enter the second section to cause the ions to pass in proximity to RF electrodes of the second section. Either or both of increasing the kinetic energy of the ions or causing the ions to pass in proximity to the RF electrodes can promote collisional activation with the background gas. The method may also or alternatively comprise a step of varying the DC potential gradient to reduce or stop ion activation by decreasing the kinetic energy of the ions and/or by changing a location and direction of the ions as they enter the second section to cause the ions to pass along or close to the longitudinal axis. In other words, varying the DC potential gradient may allow for greater control over the ion trajectory, which can be used to control (for instance, limit or induce) the ion activation.

Preferably, the method may further comprise a step of varying the DC potential gradient to switch between an ion-activation mode of operation and a reduced- or non-ion-activation mode of operation. Thus, varying the DC potential gradient may provide a straightforward manner of controlling the ion activation.

Preferably, the method may further comprise a step of varying the DC potential gradient to switch between a transmitting mode of operation of a mass spectrometer (MS), in which ions exiting the ion guide are transmitted into a downstream part of the MS, and a non-transmitting mode of operation, in which ions are prevented from reaching the downstream part. Thus, varying the DC potential gradient may provide a straightforward manner of controlling the transmission of ions into a downstream component of a mass spectrometer arrangement. For example, selective control of the fill time of a downstream part of a mass spectrometer arrangement (such as may be necessary for automatic gain control) is possible. Such selective control being provided by the DC potential gradient in the ion guide can also reduce contamination of the downstream part, as the number of ions transmitted to the downstream part may be reduced or the ions may only be transmitted when the downstream part is capable of receiving the ions. The downstream part may be capable of receiving the ions when an ion gate of the downstream part is open, for example.

Optionally, at least one electrode in the first section may be provided with a voltage for accelerating or decelerating the ions and wherein the step of varying comprises varying the accelerating or decelerating voltage applied to the at least one electrode in the first section. Thus, switching between modes of operation may be provided by the first section, which may reduce contamination of the RF electrodes in the second section and/or downstream components.

Optionally, the at least one electrode in the first section may comprise one or more electrodes provided with a voltage for accelerating the ions and one or more electrodes provided with a voltage for decelerating the ions, the step of varying the voltage comprising varying the voltage applied to the one or more electrodes provided with a voltage for decelerating the ions as a function of the voltage applied to the one or more electrodes provided with a voltage for accelerating the ions. In other words, the ratio of the accelerating and decelerating voltages applied to the electrodes in the first section may be fixed. This may enable maximum ion transmission for the widest possible mass range for a given voltage. The accelerating voltage may be twice the decelerating voltage, for example. This may ensure that ions are optimally transmitted for any second section entrance potential, thus simplifying operation and characterization of the device.

Preferably, wherein one or more electrodes in the first section may be provided with a voltage for accelerating the ions that is below a first threshold value in the reduced-, non-ion-activation and/or non-transmitting mode of operation and is above the first threshold value in the ion-activation and/or transmitting mode of operation. Thus, switching between the modes of operation may be more straightforward and simpler to be implemented than conventional methods.

Preferably, wherein one or more electrodes in the first section may be provided with a voltage for decelerating the ions that is above a second threshold value in the reduced-activation, non-ion-activation and/or non-transmitting mode of operation and is below the second threshold value in the ion-activation and/or transmitting mode of operation. Thus, switching between the modes of operation may be more straightforward and simpler to be implemented than conventional methods. A combination of accelerating and decelerating voltages may be used to switch between the modes of operation, which may allow for fine-tuned control of the switching.

Optionally, wherein at least one electrode in the first section may be provided with a voltage for accelerating or decelerating the ions, the voltage being below a third threshold value in the transmitting and/or ion-activation mode of operation. This may be the case where the at least one electrode is provided opposite the ion inlet and adjacent to the RF electrodes, such that the voltage being below a third threshold value causes ions received into the ion guide to pass in proximity to the RF electrodes. The accelerating or decelerating voltage may be above the third threshold value in the reduced-, non-ion-activation and/or non-transmitting mode of operation. Thus, switching between the modes of operation may more straightforward and simpler to be implemented than conventional methods.

Optionally, applying the DC potential gradient may comprise applying a constant or pulsed DC potential gradient.

Preferably, at least one of the first and second sections may comprise one or more annular electrodes and/or one or more electrodes having a non-closed shape (for instance, when viewed as a cross-section). Electrodes having a non-closed shape may have a more open structure for off-axis ion beam introduction and may therefore have a wide acceptance area for an entering ion beam compared to a ring-shaped entrance area of an SRIG. Annular electrodes may be easier to manufacture. A combination of annular electrodes and electrodes having a non-closed shape may be provided such that the opening/acceptance area of the electrodes varies over the length of the ion guide. This may allow a larger opening for an entering ion beam whilst also providing strong confinement of the ions to the longitudinal axis. The acceptance area of the electrodes may gradually decrease along the longitudinal axis, such that the acceptance area is smallest at an ion outlet.

Optionally, one or more annular electrodes may each comprise two or more segments and the step of applying the DC potential gradient may comprise applying a DC voltage across the two or more segments. This may provide a simple and compact configuration for controlling the ion trajectory into the second section. The one or more electrodes may be, for example, half-rings such that the DC voltage is applied across opposing half-rings. Alternatively, the two or more segments may be an even number of segments greater than two (for example, four, six, eight segments etc.). In this example, the DC voltage may be applied across pairs of opposing segments. In another example, the two or more segments may be an odd number of segments. For example, the number of segments may be three, five, seven, etc.

Optionally, the first and/or second section may comprise a stacked ring ion guide or an ion funnel. An ion guide having a reduced spatial footprint that is capable of ion-neutral separation, ion collection, and ion activation may therefore be provided. The stacked ring ion guide may be at least partially comprised of electrodes having a non-closed shape. In other words, the SRIG may not be strictly comprised of annular electrodes. The electrodes having a non-closed shape may be provided at the entrance to the second section. Annular electrodes may be provided at or towards the ion outlet. The acceptance area of the electrodes may gradually decrease along the longitudinal axis, such that the acceptance area is smallest at the ion outlet. Electrodes having a non-closed shape may allow a larger opening for an entering ion beam, whilst annular electrodes may provide strong confinement of the ions to the longitudinal axis for ejection of ions into a downstream component.

Preferably, the non-closed shapes may be curved electrodes. For example, the electrodes may be half-rings or U-shapes. Half-rings and U-shapes may be less complex and/or expensive to manufacture than other non-closed shapes.

In accordance with a second aspect, there is a system comprising a mass spectrometer arrangement and a controller configured to operate the mass spectrometer arrangement in accordance with any of the methods of the first aspect.

In accordance with a third aspect, the methods described above may be implemented as a computer program comprising instructions to operate a computer or computer system controlling a mass spectrometer arrangement. The computer program may be stored on a computer-readable medium, which may be non-transitory. The computer program may comprise instructions that, when executed, cause the computer to perform the above methods.

The computer system may include a processor—for instance, a central processing unit (CPU). The processor may execute logic in the form of a software program. The computer system may include a memory including volatile and non-volatile storage medium. The different parts of the system may be connected using a network (for instance, wireless networks and wired networks). The computer system may include one or more interfaces. The computer system may contain a suitable operating system. A suitable operating system may be UNIX (including Linux) or Windows®, for example.

In accordance with a fourth aspect, there is an ion guide comprising a first section and a second section, the second section having a longitudinal axis. The first section comprises an ion inlet, offset from the longitudinal axis. The offset may be a lateral and/or non-zero angular offset. The first section further comprises one or more electrodes configured to produce a DC potential gradient along a dimension that is at a non-zero angle to the longitudinal axis, the DC potential gradient directing ions towards the second section and causing ion activation. The second section comprises electrodes configured to produce an RF field that confines the ions from the first section to the ion guide.

The DC potential gradient may be provided by an arcuate DC electrode that is continuous along the first section, or first and second sections, of the ion guide. In other words, the DC electrode may be a single electrode, rather than stacked electrodes.

Preferably, the ion guide is configured to perform the steps of any of methods in accordance with the first aspect.

Preferably, the first section further comprises a decelerating electrode configured to generate a DC and/or RF field that at least partially cancels the DC potential gradient. Partially cancelling the DC potential gradient may mean reducing the magnitude of the DC potential gradient. A DC and/or RF field that at least partially cancels the DC potential gradient may allow deceleration of the ions to aid in guiding the ions into the second section of the device. Thus, finer control of the ion trajectory into the second section can be provided. This in turn may allow for controlled/selective ion activation by being able to direct the ions closer to the RF electrodes of the second section to induce RF heating, or to direct the ions along the longitudinal axis when a reduced- or non-ion activation mode is desired.

The ion guide may comprise an ion funnel, and the first and second sections may comprise sections in the ion funnel. An ion guide having a reduced spatial footprint that is capable of ion-neutral separation, ion collection, and ion activation may therefore be provided.

The offset of the ion inlet may be provided by a displacement of a lengthwise axis of the first section from the longitudinal axis, wherein the displacement is a lateral and/or non-zero angular displacement. Providing an offset in this manner may provide more space for neutral molecules and adduct molecules in a gas jet to be separated from the ions, for example, via an exhaust port.

Optionally, the ion guide may comprise two distinct ion funnels. Thus, a device capable of ion-neutral separation, ion collection, and ion activation having a simple configuration may be manufactured. Alternatively, the first and second sections may be sections of a conjoined ion funnel. A conjoined ion funnel may provide more space for neutral molecules and adduct molecules in a gas jet to be separated from the ions.

Preferably, the dimension may be orthogonal to the longitudinal axis. The DC potential gradient being along a dimension orthogonal to the longitudinal axis may mean that maximum ion activation can be achieved by collisions with a background gas. The DC potential being along the orthogonal dimension may also provide more precise control of the ion trajectory into the second section.

Preferably, at least one of the first and second sections may comprise one or more annular electrodes and/or one or more electrodes having a non-closed shape (when viewed as a cross-section, for instance). Electrodes having a non-closed shape may have a more open structure for off-axis ion beam introduction and may therefore have a wide acceptance area for an entering ion beam compared to a ring-shaped entrance area of an SRIG. Annular electrodes may be easier to manufacture. A combination of annular electrodes and electrodes having a non-closed shape may be provided such that the opening/acceptance area of the electrodes varies over the length of the ion guide. This may allow a larger opening for an entering ion beam whilst also providing strong confinement of the ions to the longitudinal axis. The acceptance area of the electrodes may gradually decrease along the longitudinal axis, such that the acceptance area is smallest at an ion outlet.

Preferably, the one or more electrodes may comprise two or more segments and the step of applying the DC potential gradient may comprise applying a DC voltage across the two or more segments. This may provide a simple and compact configuration for controlling the ion trajectory into the second section. The one or more electrodes may be, for example, half-rings such that the DC voltage is applied across opposing half-rings. Alternatively, the two or more segments may be an even number of segments greater than two (for example, four, six, eight segments etc.). In this example, the DC voltage may be applied across pairs of opposing segments. In another example, the two or more segments may be an odd number of segments. For instance, the number of segments may be three, five, seven etc.

Optionally, the first and/or second section may comprise a stacked ring ion guide or an ion funnel. An ion guide having a reduced spatial footprint that is capable of ion-neutral separation, ion collection, and ion activation may therefore be provided. The stacked ring ion guide may be at least partially comprised of electrodes having a non-closed shape. In other words, the SRIG may not be strictly comprised of annular electrodes. The electrodes having a non-closed shape may be provided at the entrance to the second section. Annular electrodes may be provided at or towards the ion outlet. The acceptance area of the electrodes may gradually decrease along the longitudinal axis, such that the acceptance area is smallest at the ion outlet. Electrodes having a non-closed shape may allow a larger opening for an entering ion beam, whilst annular electrodes may provide strong confinement of the ions to the longitudinal axis for ejection of ions into a downstream component.

Preferably, the non-closed shapes may be curved electrodes. For example, the electrodes may be half-rings or U-shapes. Half-rings and U-shapes may be less complex and/or expensive to manufacture than other non-closed shapes.

The above methods may be implemented in a system comprising a mass spectrometer arrangement (the mass spectrometer arrangement including an ion guide) and a controller configured to operate the mass spectrometer arrangement.

It should be noted that any feature described herein may be used with any particular aspect or embodiment of the invention. Moreover, the combination of any specific apparatus, structural or method features is also provided, even if that combination is not explicitly disclosed.

The invention will now be described with reference to the attached drawings depicting different embodiments thereof, the drawings being provided purely by way of example and not limitation.

BRIEF DESCRIPTION OF DRAWINGS

The invention may be put into practice in a number of ways, and preferred embodiments will now be described by way of example only and with reference to the accompanying drawings, in which.

Figure 1:
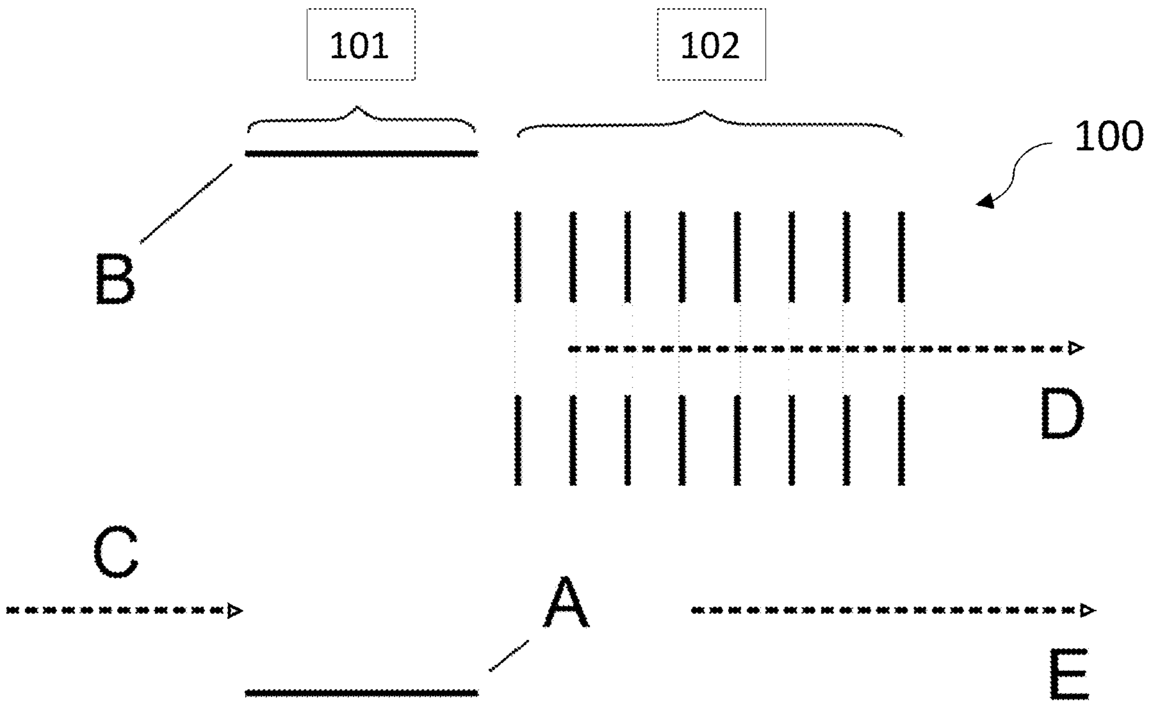
FIG. 1 illustrates an ion guide for ion activation comprising first and second sections, where the second section is a stacked ring ion guide.

It should be noted that the Figures are illustrated in schematic form for simplicity and are not necessarily drawn to scale. Like features are provided with the same (or similar) reference numerals.

DESCRIPTION OF PREFERRED EMBODIMENTS

The inventors have recognized that many of the off-axis geometries described above provide only limited control over the ion trajectory inside the second section, for example, because ions are introduced laterally offset with respect to the device axis of the second section and captured only by the RF potential. In view of this issue, and the issues discussed, the present disclosure proposes to integrate a means for substantial ion activation and a means for ion-neutral separation in the sub-ambient (fore-vacuum) region of a mass spectrometer (MS) into a single device by using a variable DC field applied at an angle to an initial direction of travel of ions during a first section of the device. The DC field corresponds to a DC potential gradient along a dimension of the mass spectrometer. This DC voltage gradient may then be at least partially reduced by another DC field and/or an RF potential in the same, or a subsequent, section of the device. Thus, ions are efficiently collected and guided through an exit orifice (outlet), whereby the entrance of the second section is positioned significantly away from the initial line of travel of the ions entering the device. One aim of this device is to reduce the requirements on manufacturing and electronics to drive the device. Integrating a means for substantial ion activation within the ion collecting device reduces complexity, spatial footprint, and cost of the ion device, especially when the same DC electrodes are used for steering the ion beam through the off-axis geometry and for ion activation. This is particularly useful in the context of a "table-top"/"miniature"/portable mass spectrometer.

Ion activation is achieved either through collisions with the background gas due to the directed velocity of the ions in the first section, by RF heating due to close proximity of the ion beam to the RF electrodes in the second section, or through a combination of the two. The radial position and the angle of incidence of the ion beam entering the second section, and thereby the proximity of the ion trajectory in the second section to the RF electrodes, can be controlled using the DC potential gradient in the first section. In other words, the DC potential gradient can either gently steer the ions from the off-axis ion inlet towards the device axis or it can be increased to induce ion activation. The variable DC potential gradient can be applied in a region without a radially confining RF potential such as in FIG. 2A, or it can be superimposed on such a potential, for instance, in an ion tunnel or a conjoined ion guide.

Radial confinement inside the RF potential of an ion collecting device improves the emittance of collisionally activated ions and fragments generated within, thus reducing the required acceptance area of the subsequent ion guide and ultimately improving transmission and robustness. By using a DC voltage to control ion activation instead of the RF field that creates the trapping potential, the transmitted mass range can be kept relatively wide. Moreover, if the RF level is not needed to control ion activation, the driving electronics can be operated at a lower level.

Furthermore, performing ion activation in an ion collecting device with an off-axis geometry means that both background gas and neutral molecules that are shed due to ion activation are separated from the ions of interest at an early stage of the mass spectrometer.

To reduce cost and complexity of an instrument, it can be desirable to combine the tasks of ion-neutral separation, ion collection, and ion activation into a single device. Thus, one problem addressed by the present invention is to achieve this with a minimal level of complexity of the electrode geometry and required electronics while maintaining a high level of ion transmission.

The present disclosure provides a method for ion activation in an ion guide that comprises a first section and a second section, the second section having a longitudinal axis. The longitudinal axis of the second section may coincide with an axis of subsequent ion optics. The ion guide may form part of a mass spectrometer arrangement. The method involves receiving ions into the first section of the ion guide at a trajectory that is offset from this longitudinal axis. The trajectory may also be offset from or tilted with regards to a lengthwise axis of the first section. A DC potential gradient is applied in the first section along a dimension that is at a non-zero angle to the longitudinal axis to direct the ions towards the second section and cause selective ion activation. The DC potential gradient may thus also be non-collinear with the initial ion trajectory. An RF (AC) field is applied in the second section of the ion guide to confine the ions to the ion guide. Thus, a method and ion guide providing an unexpected regime of particularly effective ion activation is disclosed.

It will be understood that the DC potential gradient may be caused by a DC power supply supplying a DC current/voltage to one or more electrodes. In other words, an electrode configured to produce a DC potential gradient may receive a DC current/voltage. The term "DC electrode" does not necessarily imply the existence of an electrical current through those electrodes, but indicates only that the applied voltage is static, or if non-static, is non-oscillatory. For example, a pulsed DC current may be provided to the electrodes, which may change in value but does not change direction.

Likewise, it will be understood that the RF field may be caused by an AC power supply. The term "RF electrode" does not necessarily imply the existence of an electrical current through those electrodes, but indicates only that the applied current/voltage is periodic and oscillatory.

The present disclosure can be envisioned in conjunction with any one of the SRIG or multipole devices discussed above. Such devices may be denoted in the following as ion collecting devices to reflect their large ion acceptance area as compared to a skimmer orifice.

The first section may generally be a section in which ions are separated from an incoming gas jet and directed towards the longitudinal axis of the second section. The lengthwise axis of the first section may be offset from the longitudinal axis of the second section. The first section may thus also be referred to as an off-axis section. The second section may generally be a section in which ions are radially focused to match the acceptance area of downstream ion optics. The first and second sections may form parts of a single ion guide. In other words, the first and second sections may be stacked in series and may be parts of an ion funnel or SRIG. In another example, the first and second sections may be parts of first and second ion guides. In another example, the first and second sections may be parts of a conjoined ion guide. A conjoined ion guide may be formed by two or more ion guides stacked in parallel.

The DC potential gradient may be at least partially cancelled or reduced by applying a DC and/or RF field in the first section of the device. This provides greater control over how the ions are directed into the second section and the ion activation. Partially cancelling/reducing the DC potential gradient may mean that the potential gradient is partially compensated or balanced, such that the displacement of the ions by the potential gradient is reduced, or that the DC potential gradient is superimposed on another potential to reduce the gradient, for instance, in an ion tunnel/funnel or conjoined ion guide with a radially confining RF potential.

The cancellation may be along a dimension in which the potential gradient is applied and may additionally have another component along a different dimension. The cancellation may be provided by an opposing electrode opposite the electrode causing the DC potential gradient. Opposite may mean directly opposite or laterally offset from. The opposing electrode may be one or more electrodes and may comprise one or more DC electrodes and/or one or more RF electrodes. The RF electrodes may be electrodes in the second section or may be other RF electrodes. For example, the RF electrodes may extend as part of an ion collecting device into the first section.

The ions may be received from an ion inlet offset with respect to the longitudinal axis of the second section. The ion inlet may be a bore or cavity from which ions enter a section of the ion device. For example, it may be an exit inlet from another section of the ion device or mass spectrometer. In the preferred embodiment, ions enter the device from the ion source through a heated inlet capillary, which is typical for electrospray ionization mass spectrometry.

Additionally or alternatively, the first section of the ion guide may be offset from the longitudinal axis. An offset may be a lateral and/or non-zero angular offset. A lateral offset may mean that an element is displaced or transposed along an axis parallel to the dimension along which the DC potential gradient is applied. An angular offset may mean that a longitudinal axis of one element is at/displaced at an angle to a longitudinal (lengthwise) axis of another element. An offset may accordingly also be referred to as a displacement.

Applying the DC potential gradient may comprise applying a constant or a pulsed DC potential gradient. Thus, finer control of the ion trajectory (for instance, the radial position and the angle of incidence of the ion beam in the second section) can be provided.

The DC potential gradient in the first section may be used to switch between a transmitting mode of operation, in which ions are transmitted into a downstream part of the MS, and non-transmitting mode of operation, in which ions are prevented from reaching the downstream part. This can be advantageous where, for example, the downstream part of the MS is operating in a mode in which ions are being rejected. For instance, in orbital trapping mass spectrometers, ions are commonly accumulated in a C-trap before they are injected as a pulse into the orbital trapping mass spectrometer. The total amount of time during which ions are accumulated in the C-trap (the "fill time") is tightly controlled to maximize the number of ions present without exceeding a space charge limit for the C-trap and/or orbital trapping mass spectrometer (in a process known as "automatic gain control" or "AGC"). Therefore, an ion gate is provided upstream of the C-trap, which can be selectively opened/closed to control the fill time. However, closing the ion gate can result in contamination within the instrument. Using the ion-collecting ion guide to also (or instead) prevent ions reaching the C-trap will reduce contamination inside the instrument.

The dimension along which the DC potential field gradient is applied may be a dimension orthogonal to the longitudinal axis of the second section. This can maximise the ion activation achieved by collisions with a background gas. Orthogonal may mean at a 90 degree angle, to within a threshold tolerance. For example, an orthogonal angle may be 80 to 100 degrees, 85 to 95 degrees or 89.5 to 90.5 degrees.

At least one of the first and second sections may comprise a set of electrodes. The first and/or second section may be a stacked electrode ion guide and the set of electrodes may be at least partially comprised of electrodes having an opening or aperture. For example, the electrodes may be annular. For example, the electrodes may be rings forming part of an SRIG or ion funnel. Alternatively, the opening may be such that the electrodes have an open shape, rather than a closed shape. In other words, the electrodes may have ends that do not meet each other and so do not form a closed loop. This may also be referred to as the electrode having an opening or aperture or being a non-closed shape. For example, the electrodes may be curved. Curved electrodes may include horseshoe-shaped electrodes, C-shaped electrodes, U-shaped electrodes, V-shaped electrodes, half-rings and/or other non-closed rings. In comparison to ring-shaped electrodes, horseshoe electrodes (or other open-shaped electrodes) feature a more open structure for off-axis ion beam introduction and therefore provide a wider acceptance area for an entering ion beam. Thus, providing open-shaped electrodes in the first part and/or second part of the ion guide may allow the ions to be captured more effectively by the ion guide before they are focused by subsequent electrodes in the second part of the ion guide (for example, by closed ring-shaped electrodes in an ion funnel).

In one example, the curved electrodes may be half-rings and the DC potential gradient may be applied across opposing halves of the rings. This may be the case in more than one ion guide. For example, in the dual ion guide discussed with reference to FIG. 12, both ion guides may be comprised of half-rings.

A combination of shaped electrodes may be used. For example, although all electrodes in an electrode set may have an aperture, some electrodes in the set may have a horseshoe shape, while others may be rings. In another example, each electrode in the set of electrodes may have the same shape. In another example, the stacked electrode ion guide is only partially comprised of non-closed shapes, and it may comprise various non-closed shapes. Non-closed shapes may be horseshoes and U-shapes, for example.

FIG. 1 schematically depicts one embodiment of the concepts discussed above and is useful for understanding the embodiments discussed in relation to FIGS. 2A to 2C and 11 to 14. The device 100 comprises two sections 101, 102 of the device. The second section 102 may be an ion collecting device (for example, an SRIG or ion funnel), or may comprise planar RF electrodes. The first section 101 comprises an accelerating electrode A and may also include an optional decelerating electrode B, which aids to guide ions into the second section 102 of the device 100. Electrodes A and B in FIG. 1 are illustrative and could take a variety of shapes. For example, electrode A may be an L-shaped electrode and electrode B may be a U-shaped electrode. Such an example is discussed further in relation to FIGS. 2A to 2C. In another example, one or both of electrodes A and B may be planar.

In the second section 102 of the device 100, ions are collected and cooled. Refocusing and collisionally cooling ions within the second section 102 after activation improves transmission efficiency into downstream ion optics of a mass spectrometer compared to conventional in-source CID. Ions may be guided along the second section 102 by an axial DC potential gradient. For instance, a higher DC voltage may be applied across the set of electrodes from the entrance aperture to the exit aperture of the SRIG/ion funnel.

The first section 101 may be comprised solely of DC electrodes. For example, the first section 101 may include DC electrode A to direct ions into the second section 102. Tunable ion activation may thus be achieved by varying the DC potential gradient in the first section 101 via electrode A to steer the ion beam into the second section of the device and direct ions closer to the confining RF electrodes. In other words, ion activation is controlled by controlling (increasing or decreasing) the magnitude of a DC voltage applied to the DC electrode. Varying the DC field changes (i) the kinetic energy of the ions and (ii) the location and directions of the ions as they enter the second section, which in turn determines the proximity of the ion beam to the RF electrodes. Greater control over the path of ions and ion activation is thus provided, and either or both of (i) and (ii) can promote ion activation. For example, an increased DC voltage will increase the kinetic energy of the ions, promoting collisional activation, and move the ion trajectory closer to the RF electrodes of the second section 102, thereby promoting RF heating.

Another benefit is that the same DC voltage that controls ion activation can also be used to block ions entirely such that they are not transmitted by the device 100 to a downstream part of the mass spectrometer. Furthermore, using a DC voltage to control the ion activation instead of the amplitude of the RF field used to confine the ions also means that the transmitted mass range can be selected more independently. Furthermore, when the same DC electrodes are used for steering the ion beam through the off-axis geometry and ion activation, the complexity, spatial footprint and cost of the ion device is significantly reduced.

Control over selective ion activation may be further improved by including a second electrode B to decelerate ions. The decelerating electrode B maybe a DC electrode, the advantages of which are discussed above. Alternatively, electrode B may be an RF electrode.

In yet a further alternative, the first section 101 may also comprise RF electrodes as will be described with reference to FIGS. 2A to 2C, as well as, or instead of, electrode B.

Ions enter the device at an initial location and with an initial direction of travel C, which is at a significant angle to the accelerating field imposed by accelerating electrode A. For example, an inlet capillary and the first section 101 may be laterally offset from the second section 102 to provide this significant angle. A lateral offset may mean that an element is displaced along an axis perpendicular to a longitudinal axis of another element. A significant angle may be between 10 to 170 degrees. The angle may most preferably be between 40 to 140 degrees.

Ion activation is performed by accelerating ions at an angle to their initial direction of travel C in the first section 101. Due to the significant angle, a path of neutral particles/molecules E is significantly different from a path of ions D that are accelerated by the electrode A. The ions may be directed into the second portion 102 of the ion guide 100 by varying the DC potential gradient in the first section 101 via electrode A and/or by applying an RF field in the second section 102. Ion activation may thus also be achieved by directing ions closer to the accelerating RF electrodes. Advantageously, this provides tunable ion activation, wherein the ion activation is controlled by varying the DC and/or RF field.

Figure 2A:
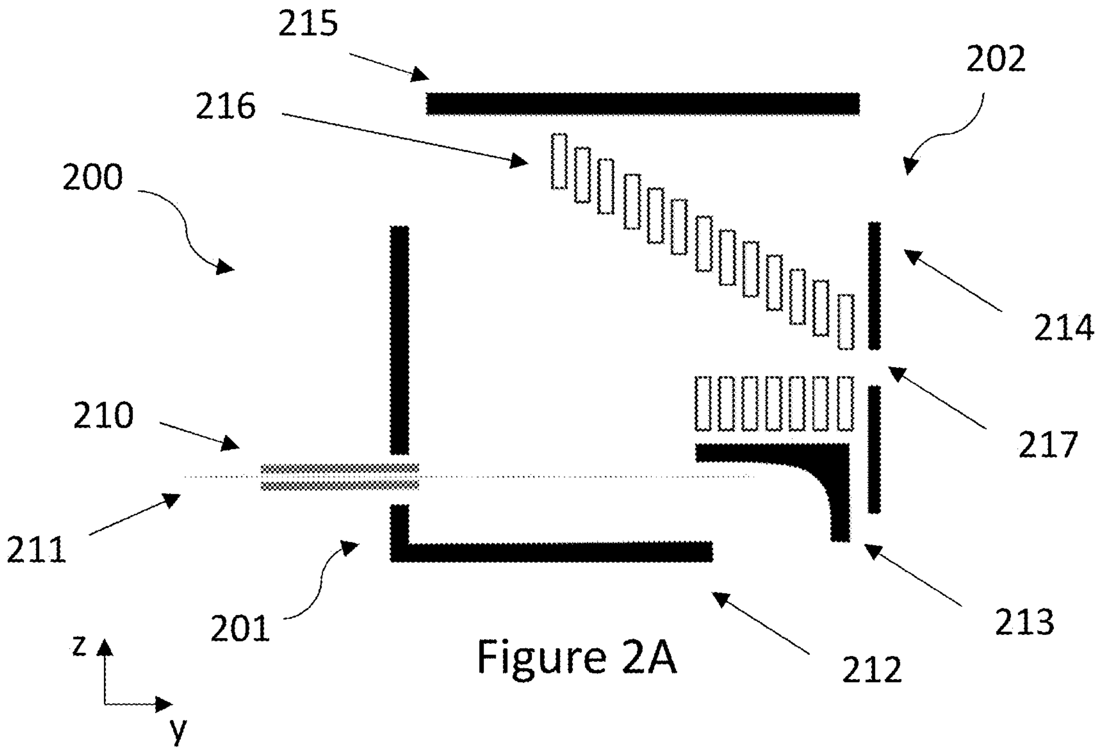
FIG. 2A shows a device for ion activation comprising a first section of an ion guide and a second section comprising an ion funnel.

FIG. 2A illustrates a further example. This example is similar in many ways to that of FIG. 1. The device 200 in FIG. 2A comprises a first part or section 201 having an ion inlet 210. The first section comprises an ion transfer device, in which ion trajectories are controlled by a combination of DC and RF fields. Ions enter the ion inlet 210, which may have a DC voltage V1, along a path 211 that is laterally offset with respect to a second part 202 of the device 200. The ions may enter the device 200 entrained (transported) in a gas jet emanating from the ion inlet 210, which may be a heated capillary. The ions are pushed out of the gas jet and towards the second section 202 of the device by an electric field in the first section 201. The second section may be an ion collecting device. The gas may be diverted out of the device 200 by a gas diverter 213, which may be grounded.

The electric field may be caused by a static DC voltage applied across the first section 201, resulting in a DC potential gradient along a dimension that is at a non-zero angle to a longitudinal axis of the second section 202. This may be provided by a DC electrode 212, which may be at DC voltage V1. As discussed above with reference to FIG. 1, the DC voltage applied to electrode 212 is variable to provide tunable/selective ion activation. Thus, V1 is not necessarily a specific voltage and may be a range of voltages.

Figure 2B:
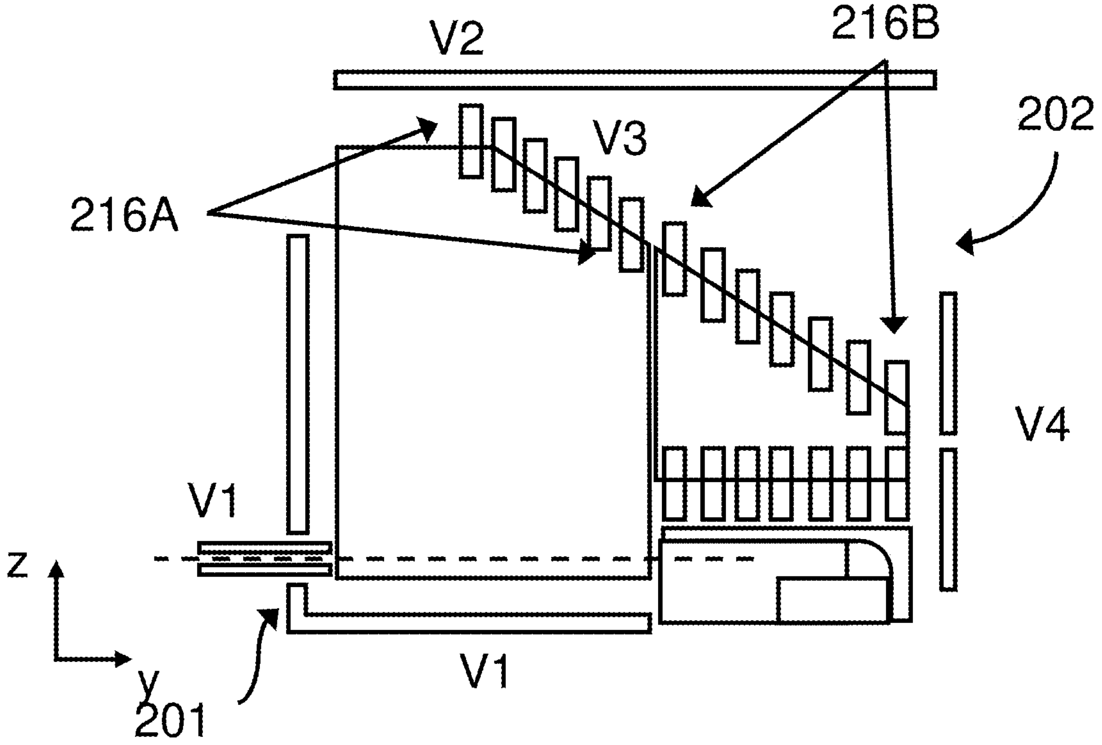
FIG. 2B illustrates exemplary first and second sections of the ion device shown in FIG. 2A.
Figure 2C:
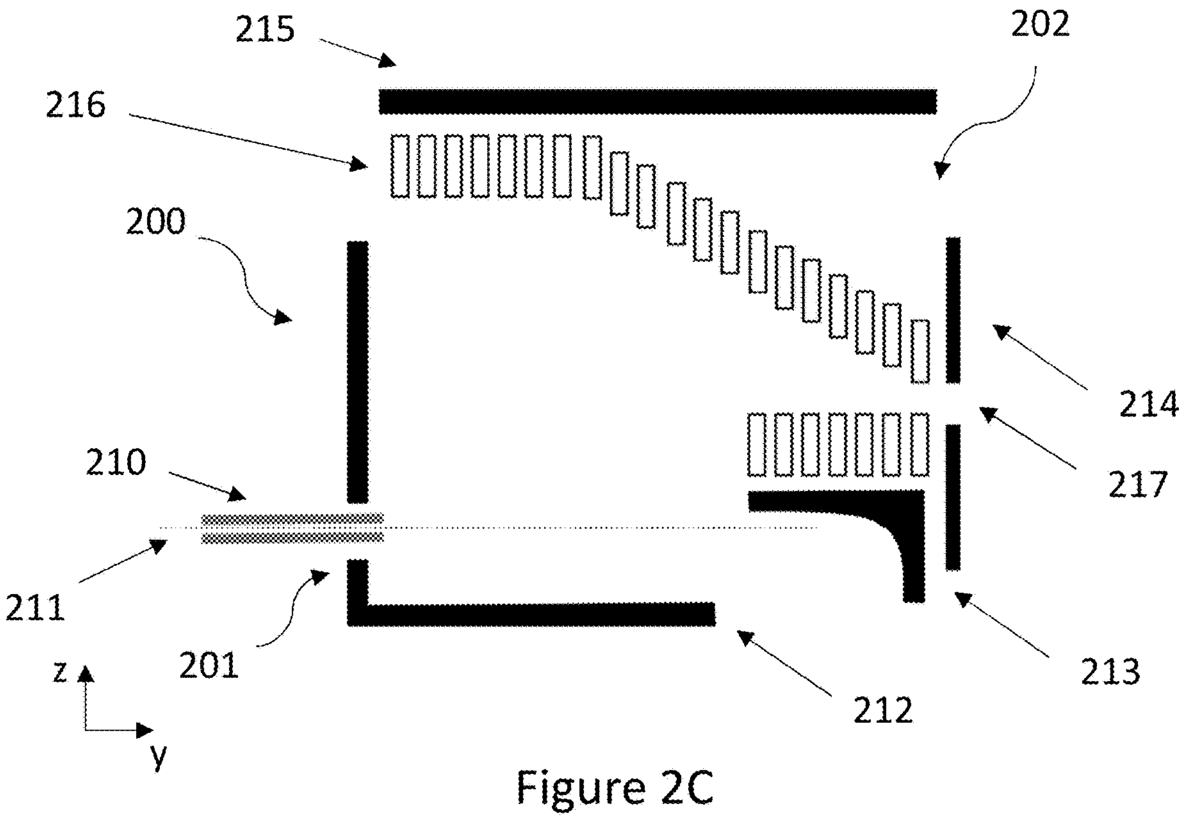
FIG. 2C depicts a device for ion activation comprising first and second sections of an ion guide.

The DC electrode 212 may be an L-shaped electrode including an aperture for the capillary 210, as in FIG. 2, or may be planar, as illustrated in FIG. 1. The electrode may also have other shapes as discussed with reference to the Figures below. The L-shaped electrode 212 has a height and a width. For example, in FIG. 2, the L-shaped electrode has a height extending in a z-direction and a width extending in a y-direction (as defined by the axes in FIGS. 2A to 2C). Although the width of electrode 212 is shown as extending along the y-axis/the height is shown as extending along the z-axis, it will be appreciated that the electrode may be offset at another, non-zero angle, such that the height and width of electrode 212 do not extend along the z- and y-axes.

In addition, the DC voltages may cause ion activation and may be used to perform ion focusing in the first section 201. Finer control of the electric field, and accordingly, the passage of the ions into the second section 202 and the extent of ion activation, may be provided by additional electrodes. Such additional electrodes may be offset with respect to the DC electrode 212.

For example, a repeller electrode 215 may be provided opposite the DC electrode 212. The repeller electrode 215 may be laterally offset from the longitudinal axis and a plane of the repeller electrode 215 may be substantially parallel to a plane of the DC electrode 212 (for instance, the plane defining the width of the L-shaped electrode, as illustrated in FIG. 2A). However, the repeller electrode 215 need not be substantially parallel to the plane of the DC electrode 212. Preferably though, the decelerating field produced by electrode 215 has a significant component along the direction of radial confinement of the RF focusing field in the second section 202 to most effectively control the minimum distance of the ion beam from the RF electrodes 216.

The repeller electrode 215 may also focus the ion beam radially. Thus, the repeller electrode 215 may also be referred to as a radial focusing electrode 215. The radial focusing electrode 215 may have an open shape, and more specifically, may be U-shaped to focus the ion beam. In the embodiment shown in FIGS. 2A to 2C, the repeller electrode 216 is U-shaped, hence is shown parallel to the accelerating electrode 212 in the z-y plane (as indicated by the axes in FIGS. 2A-C). The repeller electrode 215 may be at a DC voltage V2.

In a further example, the additional electrode may be an electrode facing the ion inlet 210 and may be a DC electrode. This arrangement is described in further detail with reference to FIG. 14.

In yet another example, the additional electrodes may be RF electrodes. These RF electrodes may be provided in addition to, or as an alternative to, repeller electrode 215 or other DC electrodes in the first section 201. Thus, whilst using only one or more DC electrodes in the first section may have the advantages discussed above, a combination of DC and RF electrodes may be used to control ion activation in the first section 201. The RF electrodes may be split electrodes or stacked half-open electrodes so that a tunable DC offset can be applied to them, or they may be RF-only electrodes providing radial confinement in addition to the potential gradient provided by one or more DC electrodes. They may have a constant inner diameter (for example, as in an ion tunnel), or a sequentially reducing inner diameter (as in an ion funnel, for instance). The RF electrodes may be electrodes 216 extending from the second section 202 into the first section 201. For example, one or more electrodes 216 forming an entrance to an ion guide (for example, as in an ion funnel or SRIG) may be used as additional electrodes. This may be achieved by including one or more additional electrodes 216 on one side of the ion funnel or SRIG to extend a portion of the ion funnel or SRIG into the first section 201. The entrance electrodes 216 may be at a DC voltage V3.

In the first section of the device, ions are accelerated between the electrodes 212, 216, and optionally, 215, (via DC voltages V1, V3, and optionally, V2) at a substantial angle to the stream of neutral gas. V1 pushes ions towards the entrance of the second section 202, whereas V2 is applied to an electrode 215 wrapping around the first section 201 to provide radial focusing and compensation of V1. As discussed above in relation to V1, V2 and V3 are not necessarily specific voltages and may be a range of voltages. For example, the voltages may be a series of static or pulsed DC voltages.

FIG. 2B illustrates one example of how the first section 201 and the second section 202 may be divided, showing the extension of electrodes 216 from the first section 201 into the second section 202. In some embodiments, the first section 201 may be defined as the section of the device 200 where ions enter and are directed towards another section of the device 200. In some embodiments, the second section may be considered as the section of the device 200 in which ions are radially focused to match the acceptance area of downstream ion optics. Thus, electrodes 216A on the left-hand side of FIG. 2B (in the darker grey region) may be considered as being in the first section 201 of the device 200, as ions are still influenced by the DC potential gradient in this region. The electrodes 216B on the right-hand side of FIG. 2B (in the light grey region) may be considered as being in the second section 202.

The second section 202 comprises a second ion guide. The second ion guide may be an ion funnel or SRIG. The electrodes 216B of the second ion guide may a closed shape, whilst electrodes 216A may have an open shape. For example, the RF electrodes 216B of the second section 202 may be closed-ring electrodes, while the RF electrodes 216A of the first section 201 may be open U-shaped electrodes. The electrodes may also be mirror symmetric.

Figure 3:
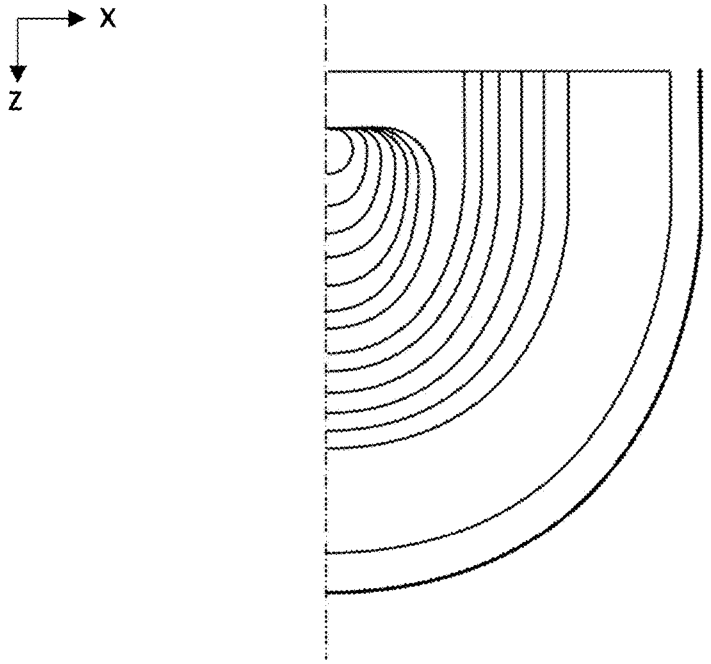
FIG. 3 shows an on-axis view of a segmented ion funnel comprised of an outer arcuate electrode which partially envelops a series of open-shaped horseshoe electrodes and closed quasi-ring-shaped electrodes.

The electrodes 216 may form an ion funnel comprising a stack of several horseshoe-shaped electrodes followed by several closed-ring electrodes. One example is shown in FIG. 3. The area enclosed by the open shape may progressively reduce in size such that electrodes 216 closer to an exit aperture 217 have a smaller open area. For instance, as in the example shown in FIG. 3, the last ten electrodes may be distorted closed ring-shaped electrodes (for instance, pseudo-circular electrodes having an opening or aperture), where the inner diameter of the individual electrodes gradually reduces until the final ring-shaped electrode forming the exit aperture 217. The inner diameter of the final ring-shaped electrode may be less than 10 mm. For instance, the inner diameter may be 3 mm.

The RF electrodes 216 at the ion guide entrance may be at a DC voltage V3, with the electrodes 216 at the exit lens 214 of the ion guide at a DC voltage V4. Ions exiting the second section 202 via the exit lens 214 may be directed into a subsequent ion guide, which may be a further RF ion guide.

FIG. 2C shows another example of using RF electrodes 216 extending from the second section 202 into the first section 201 to direct ions into the second ion guide. The half-open electrodes 216 may extend in the direction of the inlet 210. In this case, the decelerating DC electrode 215 can be omitted, as a decelerating potential can be provided across the whole of the first section 201 by the RF electrodes 216.

FIG. 3 shows an example implementation of a segmented off-axis ion funnel such as the one shown in FIG. 2 as a projection onto the x-z-plane. The dashed line indicates the mirror symmetry plane of the device. The arcuate outer electrode 215 extends along the y-direction and has a U-shape in the x-z-plane. It may surround the SRIG assembly along the entire length of the ion funnel. That is, the DC electrode 215 may be a single arcuate electrode 215, rather than a series of stacked electrodes. Six horseshoe-shaped electrodes with decreasing inner open area and seven distorted, closed quasi-ring-shaped electrodes with decreasing inner diameter are provided, finally ending in a ring-shaped electrode having an inner open diameter of 3 mm. The open-side horseshoe-shaped electrodes serve to capture ions received from the first section 201. Although FIG. 3 shows six horseshoe-shaped electrodes and seven distorted quasi closed ring-shaped electrodes, other numbers of electrodes would be possible.

Pressure in the fore-vacuum region (first section) may be about 2.0 mbar. Pressure in the subsequent region may be around 3.7E−1 mbar. In-source collision induced dissociation (CID) can be performed by applying a voltage difference between the ion guide exit lens 217 and a subsequent ion guide. The subsequent ion guide may be a quadrupole ion guide. The distance between the exit lens 217 and the subsequent ion guide may be less than 1 mm. For example, the distance may be 0.8 mm.

Figure 4:
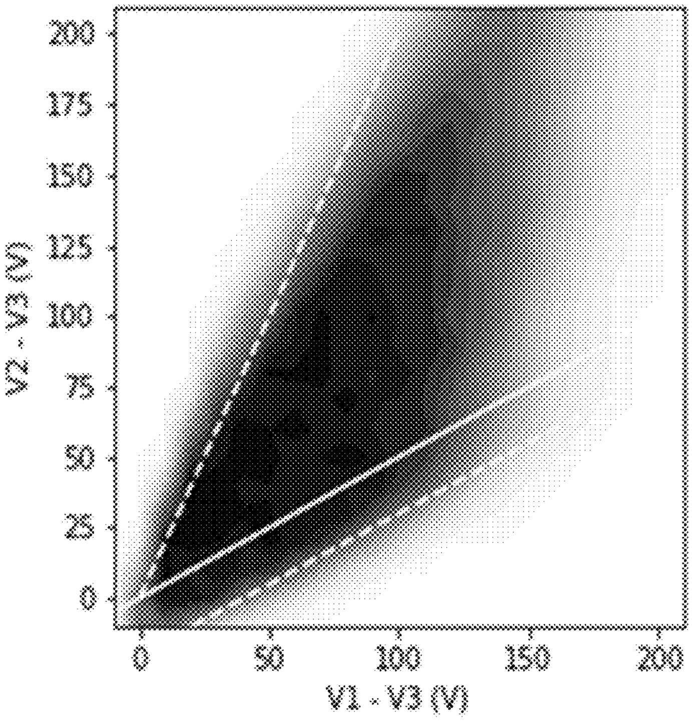
FIG. 4 shows a graph indicating the intensity of Caffeine [M+H]+ as a function of potential differences applied to different electrodes of the segmented ion funnel.

Certain combinations of DC potential gradients and RF amplitudes lead to most efficient ion transmission. Applying an at least partially cancelling DC and/or RF field may therefore comprise a step of determining a relationship between the at least partially cancelling field and the accelerating DC potential gradient to cause the at least partial cancellation. In other words, a voltage applied to a decelerating/repeller/pusher electrode may depend on a voltage applied to an accelerating electrode. This is depicted in FIG. 4, which shows a heat map of the intensity of Caffeine ions (C8H10N14O2). Darker colours indicate higher intensity. Compensation of V1 via V2 can be ensured for a range of V1 values using a simple functional relationship between the two potentials— for example, as is indicated by the solid line in FIG. 4 (indicating that V2 is changed as a linear function of V1). Proper design of the device 200 ensures that this relationship is approximately independent of ion mass-to-charge ratio (m/z). The dashed lines shown in FIG. 4 delimit the parameter space leading to most efficient ion transmission and may depend on fore-vacuum pressure and ion guide geometry. For example, the ratio of radial focusing potential (V2-V3) and the funnel entrance potential (V1-V3) is between one half and two for the device response shown in FIG. 4.

Generally, V2 is chosen to yield maximum ion transmission at a given DC voltage V1 for the widest possible mass range, and for the widest possible range of V1. Since the plateau of maximum transmission is broad, various functional dependencies are possible. FIG. 4 illustrates a linear relationship between V1-V3 and V2-V3, but other relationships are possible. The relationship illustrated by the solid line through the origin was chosen as it satisfies transmission requirements for an instrument mass range of 40 to 8000. The gradient (slope) of this relationship is 0.5, which was chosen as it requires lower V2 voltages (thus, potentially a smaller power supply is needed). A steeper gradient would potentially increase the accessible range for V1 (that is, the maximum fragmentation rate) slightly.

When V2 is too high, ions will stay too close to the gas jet and not reach the entrance of the second section 202. This cut-off point for V2 is relatively independent of gas pressure. When V2 is too low, ions may travel too far and miss the second section 202 on the opposite side. In addition, because V2 is applied to the arcuate electrode partially enveloping the SRIG device, a low V2 potential means that radial focusing is weak, which further compromises ion transmission. This cut-off for V2 depends strongly on gas pressure, because the drag field reduces the kinetic energy of the ions.

Figure 5:
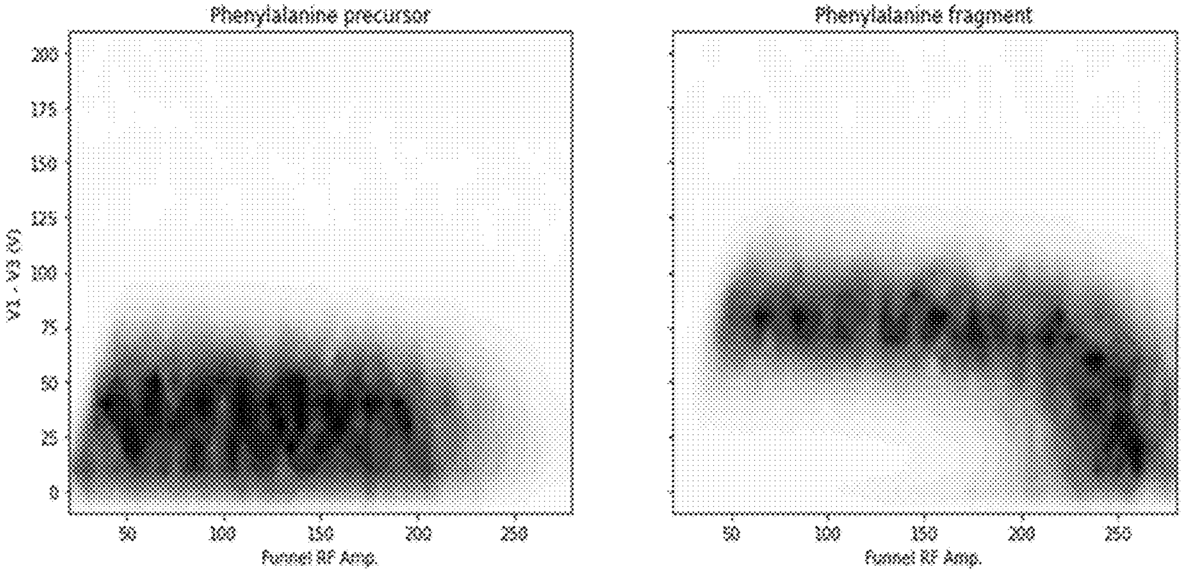
FIG. 5 shows a graph indicating intensity of Phenylalanine (m/z 166) and its major fragment (m/z 120) as a function of ion funnel entrance potential gradient and the ion funnel RF amplitude.

Setting the DC voltage V2 to $$V2 = \frac{(V1 + V3)}{2},$$

as depicted by the solid white line in FIG. 4, ensures that ions are optimally transmitted for any setting of the funnel entrance potential V1-V3, thus simplifying operation and characterization of the device. The linear dependency of $$V2 = \frac{(V1 + V3)}{2}$$

is applied for the density plot in FIG. 5.

In the ion-activation mode, the DC voltages may be set such that the average electric field strength caused by the DC potential and experienced by the ions in the first section is on the order of magnitude of 10 V/mm. For example, the average electric field strength may be set in the range of 0.1 V/mm to 50 V/mm, 0.1 V/mm to 30 V/mm or 0.2 V/mm to 20 V/mm, depending on the desired amount of activation. Other electric field strength ranges may be used. The electric field strength required for efficient ion activation may depend on the geometry of the device and on background gas pressure.

FIG. 5 shows a graph of the intensity of protonated Phenylalanine (having m/z of 166) and its major fragment (m/z 120) as a function of the funnel entrance potential (V1-V3) and the RF amplitude applied to the off-axis funnel electrodes. Darker colours indicate higher intensity. As can be seen in FIG. 5 for Phenylalanine [M+H]+ ions, increasing V1 and V2 (V2 being dependent on V1, in this case in the linear manner depicted in FIG. 4—that is, $$V2 - V3 = \frac{(V1 + V3)}{2}\Bigg),$$

has a similar effect on ion fragmentation as increasing RF amplitude used for radial focusing in the second section 202 of the device 200. At very low RF amplitude and DC voltage V1, there is almost no fragmentation, whereas for higher V1 values, the fragmentation efficiency (that is, the ratio of the summed intensities of all fragments to the sum of intensities of both the remaining precursor ions and all fragments), reaches almost 100%. At even higher values, ions are lost because the kinetic energy and angle of incidence of ions entering the second section 202 of the device 200 are too high for radial trapping. Note that RF amplitudes leading to significant fragmentation are significantly higher than those required for efficient ion transmission.

As illustrated by FIG. 5, the DC potential gradient may be varied to switch between an ion-activation mode of operation and a reduced- or non-ion-activation mode of operation. A reduced-ion-activation mode of operation may induce minimal or limited ion activation and may be provided by applying a voltage for accelerating the ions to one or more electrodes in the first section (for example. electrode A, electrode 212, one or more segments of electrodes 1119, 1316, etc.) that is below a first threshold value and/or applying a voltage for decelerating the ions to one or more electrodes in the first section (for instance, electrode B, electrodes 216/216A, electrode 215, one or more segments of electrodes 1119, 1316, etc.) that is above a second threshold value. In another example, the reduced-ion-activation mode may be provided by applying an accelerating voltage to one or more electrodes in the first section (for example, electrode 1420) that is above a threshold value and/or applying a decelerating voltage to one or more electrodes in the first section (for example, electrode 1415).

A non-ion-activation mode of operation induces no significant ion activation/fragmentation and may be likewise provided by applying DC voltages above/below a threshold value.

The ion-activation mode of operation may be provided by applying an accelerating voltage to the one or more electrodes in the first section (for instance, electrode A, electrode 212, one or more segments of electrodes 1119, 1316, etc.) that is above a third threshold value and/or applying a decelerating voltage to the one or more electrodes in the first section (for instance, electrode B, electrodes 216/216A, electrode 215, one or more segments of electrodes 1119, 1316, etc.) that is below a fourth threshold value. In another example, the ion activation mode may be provided by applying a decelerating voltage to one or more electrodes in the first section (for example, electrode 1415 and/or electrode 1420) that is below another threshold value.

One or more of the threshold values may be the same. For example, the first and third threshold values or the second and fourth threshold values may be the same. The accelerating and/or decelerating voltages applied to the at least one electrode may also be below a fifth threshold value to avoid ion loss.

Similarly, the DC potential gradient may be varied to switch between a transmitting mode of operation, in which ions are transmitted into a downstream part of the MS, and non-transmitting mode of operation, in which ions are prevented from reaching the downstream part. The DC potential gradient may be varied by varying an accelerating and/or decelerating voltage applied to one or more electrodes.

Figure 6:
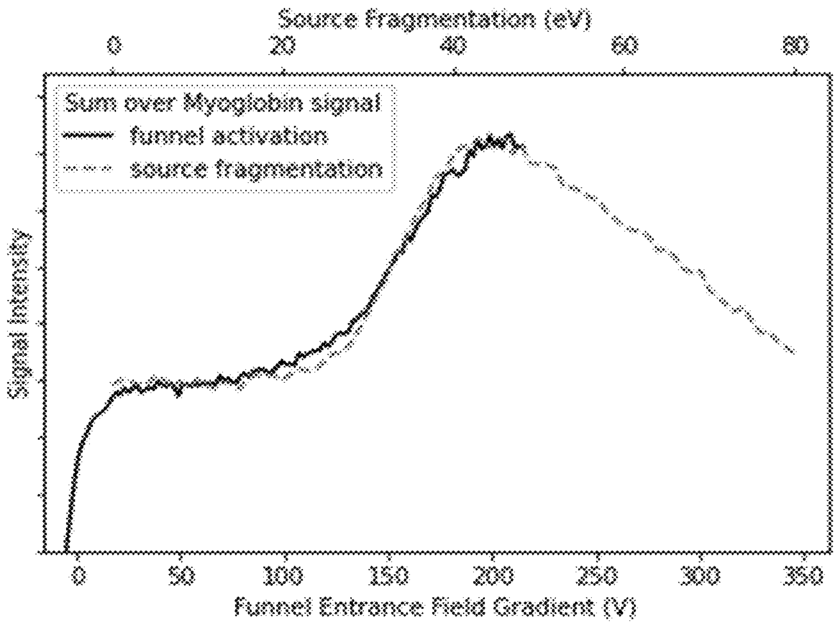
FIG. 6 shows a comparison of the combined intensity of a number of charge states of myoglobin as a function of the ion funnel entrance potential difference and in-source fragmentation energy.
Figure 7:
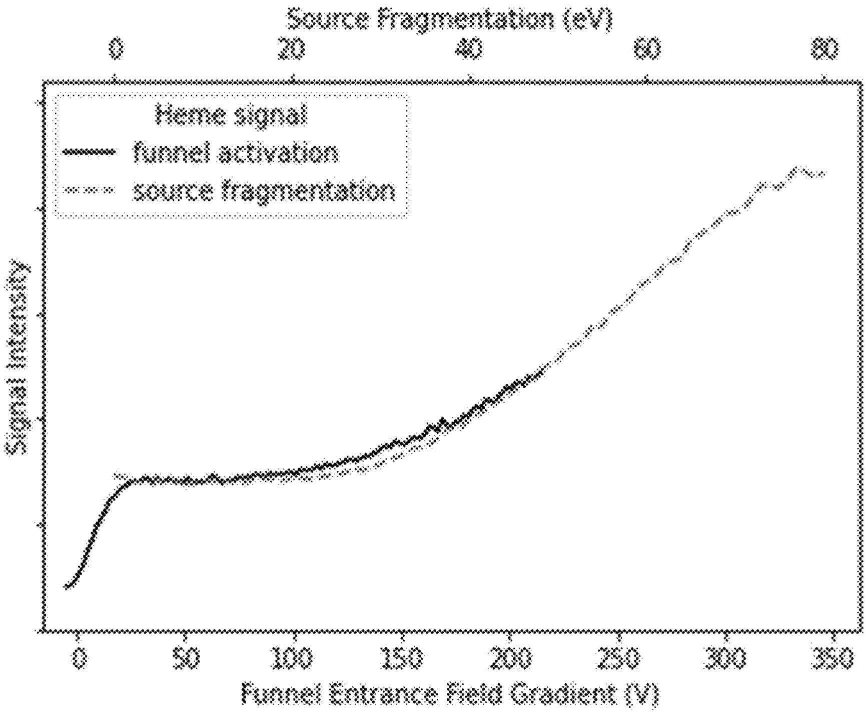
FIG. 7 shows the intensity of the Heme group of a myoglobin sample as a function of ion funnel entrance potential difference and in-source fragmentation energy.

A comparison of the efficiency of the funnel entrance potential and of conventional in-source CID for declustering is presented in FIG. 6 and FIG. 7. These Figures show the summed intensity of the major charge states 10+ to 27+ (m/z 628.8 to 1696.1) of the molecular ion and the intensity of the Heme group (m/z 616.17), respectively, for denatured Myoglobin (1 μM in 60% ACN+0.1% FA). The intensity is shown as a function of funnel ion activation via an increase of the funnel entrance gradient (bottom axis, black solid line) on the one hand, and as a function of the in-source fragmentation energy (upper axis, grey dashed line) on the other. Abscissae are scaled such that both curves roughly overlap. It may be noted that the point of optimal ion signal differs for different charge states, as higher charge means that more energy is acquired within the same electric field. While moderate activation aids in the removal of unwanted adducts, increasing the activation energy above the optimum leads to ion loss due to fragmentation, with higher charge states being lost first. Maximum overall transmission is reached at about 42 eV IS-CID or 200V funnel entrance gradient, with both methods yielding equal optimal signal intensity. As shown in FIG. 7, increased activation yields a higher signal intensity for the labile Heme group. Again, observations are qualitatively similar between the two activation methods. Both experiments were performed with a constant RF amplitude of 150 Vpp (peak-to-peak voltage) applied to the funnel electrodes. Increasing this amplitude increases ion activation only insignificantly.

Figure 8:
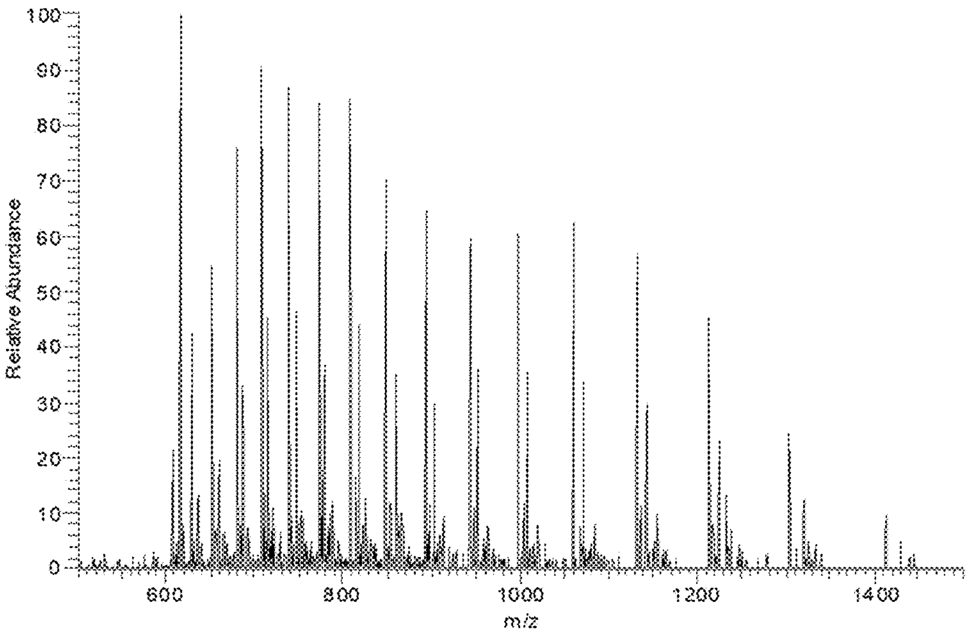
FIG. 8 illustrates a myoglobin spectrum acquired without ion activation.
Figure 9:
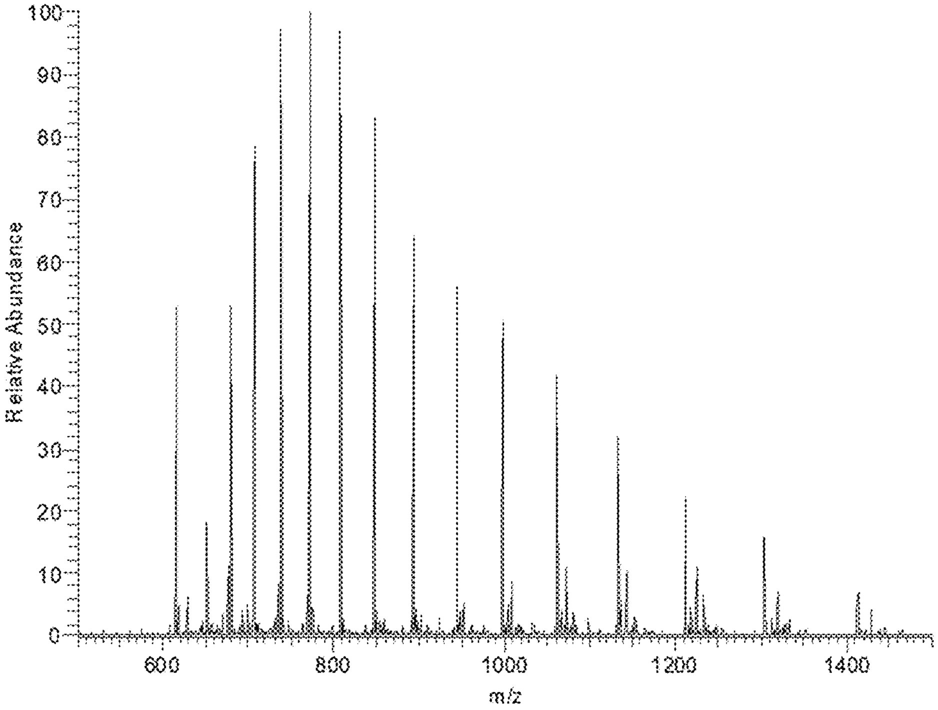
FIG. 9 depicts a myoglobin spectrum acquired with an ion funnel entrance potential difference of 200V.
Figure 10:
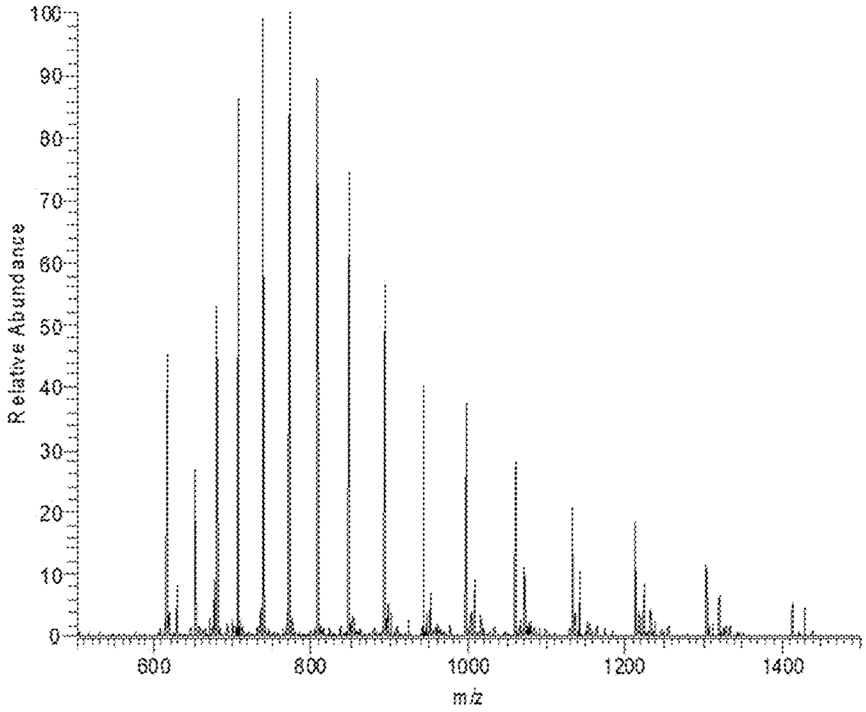
FIG. 10 shows a myoglobin spectrum where in-source CID is used.

Myoglobin spectra according to no ion activation, to 42 eV IS-CID, and to 200V funnel entrance potential are shown in FIGS. 8 to 10, respectively. Not only is the overall signal intensity comparable between the two methods of ion activation (FIGS. 9 and 10) and higher than without activation (FIG. 8), but also the charge state distribution shows the same shape. This demonstrates again that the ion activation applied by the two different methods results in qualitatively similar signal enhancements and product ion distributions.

Figure 11:
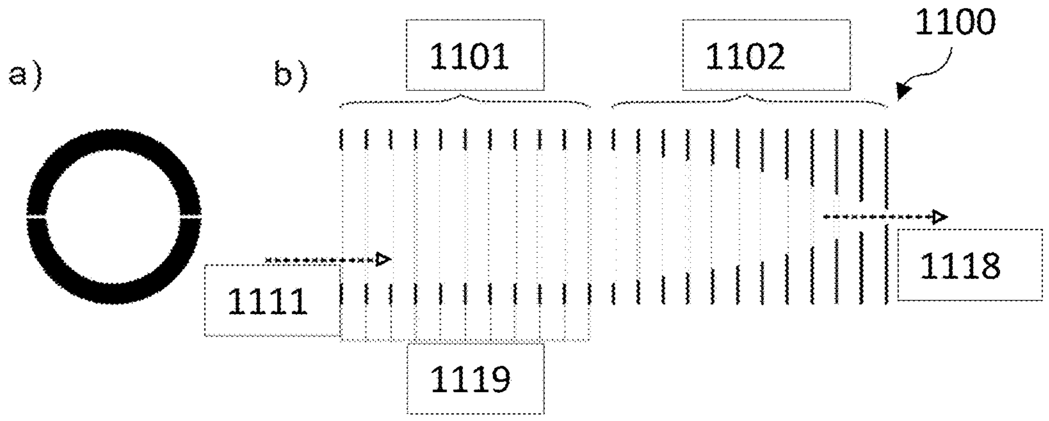
FIG. 11 illustrates one embodiment of a device for off-axis ion activation using split-ring electrodes.

FIG. 11 illustrates another exemplary embodiment of the present disclosure. The first section 1101 of the device 1100 is itself an RF ion guide (for example, it may be an ion tunnel or SRIG). At least a subset of the ring apertures 1119 are split into two or more segments such that a DC potential gradient used to steer ions into the second section of the device 1102 is applied between the two or more segments. Thus, at least one segment may be an accelerating electrode and at least one segment may be a decelerating electrode. FIG. 11 a illustrates an exemplary embodiment in which half-rings 1119 are used, in which case, the DC potential gradient may apply between opposing halves of the ring apertures 1119. Other partitioning of the electrodes is devisable, including (for example) three, four, or more segments, and including designs in which some segments of an aperture electrode have a larger angular extent than others. The phase of the RF potential applied between opposing segments of an aperture may be the same, or it may be out of phase (for example, with a phase shifted by 180 degrees).

As in FIGS. 1 and 2, ions enter along a path 1111 at an offset (lateral and/or angular) to the longitudinal axis of the second section 1102. The DC potential in the first section 1101 guides the ions towards the longitudinal axis, such that ions exit along a path 1118 corresponding to the longitudinal axis.

Figure 12:
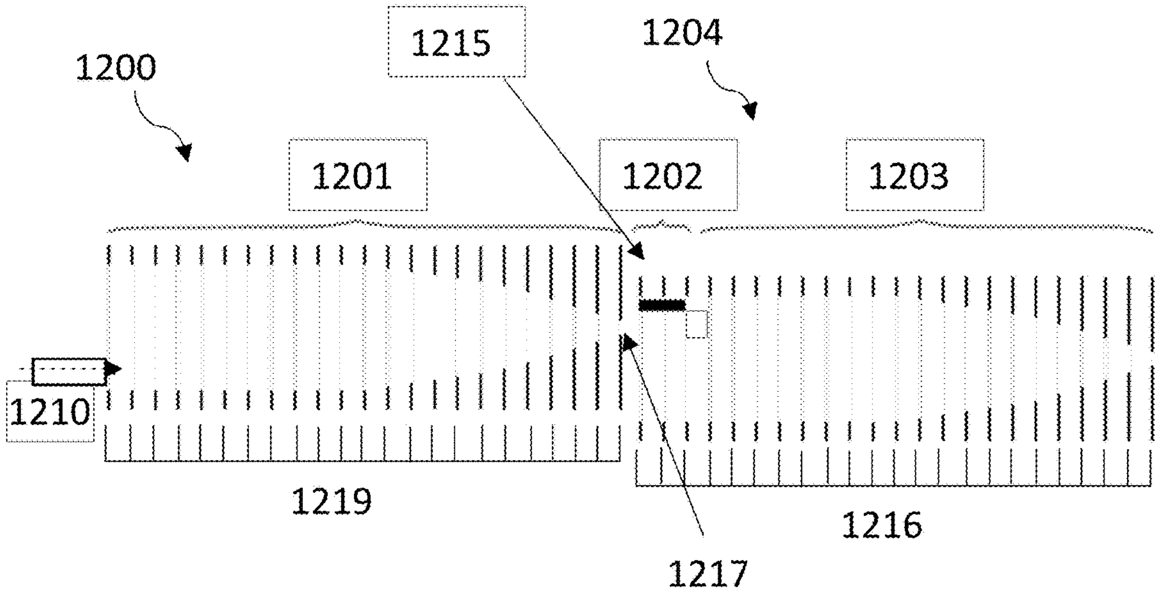
FIG. 12 depicts another example of an off-axis ion guide with tunable ion activation.

Another embodiment is shown in FIG. 12, in which the device 1200 comprises two ion guides 1201, 1204 stacked in series (in other words, one after the other). The ion guides 1201, 1204 may be ion funnels. As described with reference to FIGS. 1, 2 and 11, the ion inlet 1210 may be offset with respect to the longitudinal axis of the second section 1203, such that ions entering the first ion guide 1201 are subject to RF heating in the first ion guide 1201. This may also help the separation of the ions of interest from neutrals, solvent clusters, droplets and other undesirables.

The ion guides 1201 and 1204 are offset with respect to each other. This offset may be angular and/or lateral. For example, although FIG. 12 depicts the two sections 1201, 1204 as being positioned collinearly, the two sections 1201, 1204 may also be stacked at an angle, such that a lengthwise axis of ion guide 1201 intersects the longitudinal axis of ion guide 1203 at a non-zero angle.

Ions are directed through ion guide 1201 in the conventional manner using electrodes 1219 and exit the ion guide 1201 via the exit bore 1217/enter ion guide 1204 via ion inlet 1217. A pusher electrode 1215 accelerates the ions along a dimension that is at a non-zero angle to the longitudinal axis of the second ion guide 1204. That is, ions are laterally accelerated in section 1202 of the off-axis dual ion funnel 1200 by a DC potential gradient induced by a pusher electrode 1215. The pusher electrode 1215 may thus cause the ions to be directed towards the RF electrodes 1216 to selectively cause ion activation. The accelerating electrode 1215 may form part of the second ion guide 1204, indicated in FIG. 12 as section 1202. That is, the first section in which ions are directed towards the second ion guide 1204 and experience selective ion activation may comprise the first ion guide 1201 and a portion 1202 of the second ion guide 1204. In other words, first section may be spread across two ion guides. In another example, the first section may be section 1202 (including exit bore/ion inlet 1217) and the second section may be 1203.

Alternatively, the accelerating electrode 1215 may be in a separate region between the first ion guide 1201 and the second ion guide 1204, similar to the system described with reference to FIG. 1.

Although the pusher electrode 1215 is shown as extending in a direction parallel to the longitudinal axis of the second section 1203, it will be appreciated that the pusher electrode 1215 may be angularly offset from the longitudinal axis at another, non-zero angle, as described in respect of the above embodiments. It is only necessary that the electrode 1215 provides a potential gradient along a dimension that enables selective ion activation.

Figure 13:
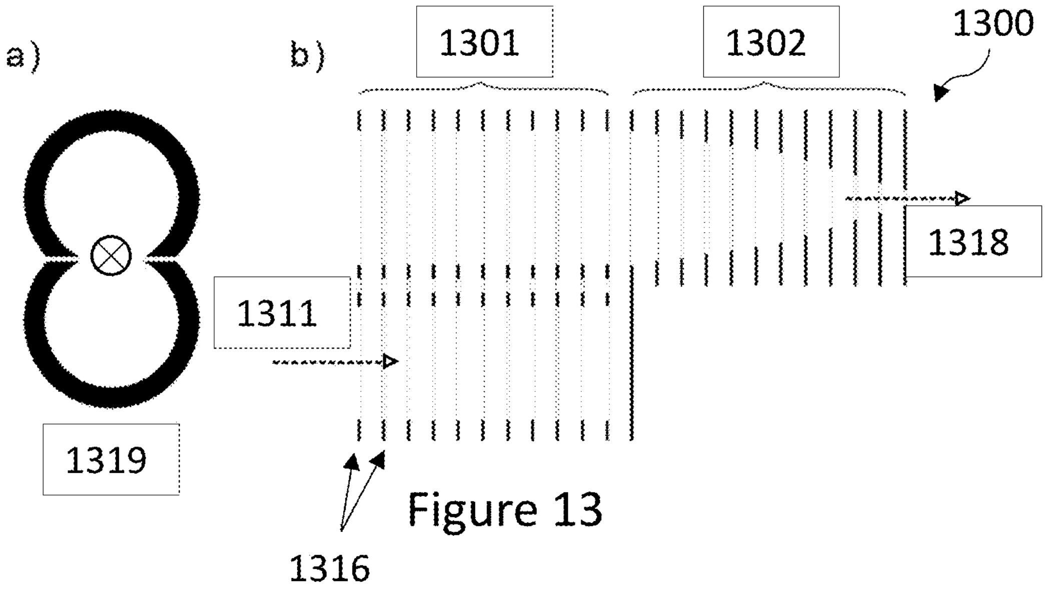
FIG. 13 shows a conjoined ion guide for ion activation in accordance with the present invention.

FIG. 13 depicts a further example in which the device 1300 comprises two ion guides stacked in parallel to form a conjoined ion guide. The conjoined section of the ion guides may comprise electrodes 1316 having an open shape. The shape may be an incomplete circle (for instance, a C-shaped electrode), such that the conjoined ion guide has a figure eight outline, as shown by the cross-section 1319 in FIG. 13. It will be appreciated that the cross-section 1319 is exemplary and other cross sections may be used. For example, one set of electrodes may be larger or smaller than the other (for example, creating a distorted figure eight) or other open/non-closed shapes may be used (for instance, horseshoe and/or U-shaped electrodes). This cross-section 1319 also indicates the lengthwise axis of the first section by the vector symbol.

Although the conjoined ion guide is shown in FIG. 13 as comprising an ion funnel and a truncated stack of coaxially stacked rings, it will be appreciated that other configurations are possible. For instance, both ion guides may be ion funnels, or the ion tunnel may extend to the same length as the ion funnel, or the ion tunnel entrance may extend beyond that of the ion funnel.

Ions enter the first section 1301 in the first ion guide along path 1311. The potential gradient is applied in the first section 1301 of the conjoined ion guide to transfer ions from the first ion guide into the second ion guide. In other words, ions are drawn into the conjoined section/second ion guide by a difference in electric potential between the two sections. The ions then leave the second ion guide via the second section 1302 along path 1318.

The potential gradient, which may be a DC offset, can be increased or decreased to provide tunable ion activation. The DC offset may be provided in addition to an RF field in the conjoined ion guide. The opening of the conjoined section may also vary over the length of the device 1300, or the DC offset applied to each electrode may be different for adjacent electrodes, to promote a gradual increase of the potential gradient along the device axis that drives the ions across the conjoined section.

Figure 14:
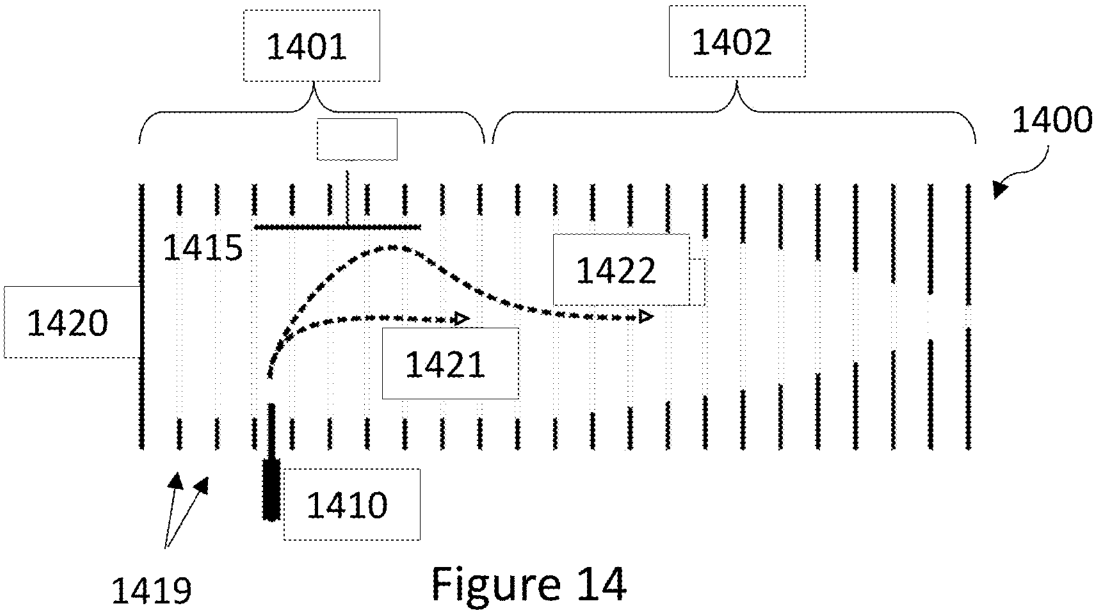
FIG. 14 illustrates a device for ion activation comprising a first section of an ion tunnel with an orthogonal ion inlet and a second section comprising an ion funnel.

With reference to FIG. 14, as yet a further example of the present disclosure, the ion guide may comprise an electrode that faces the ion inlet to provide additional control to the ion trajectory.

An ion guide 1400 (which may be an ion collecting device—for example, an ion funnel or SRIG) comprises a first section 1401 having at least one electrode 1415 offset from the longitudinal axis of the second section 1402 and an ion inlet 1410 also offset from the longitudinal axis. The offset may be angular and/or lateral. The at least one electrode may also comprise electrode 1420 offset from the longitudinal axis. The one or more electrodes 1415, 1420 may also be referred to as repeller electrodes 1415, 1420. The first section 1401 may also comprise a set of electrodes 1419. In this case, the electrode 1420 is placed in front of the first RF electrode 1419.

Ions enter the first section 1401 via the ion inlet 1410. The ion inlet 1410 may be offset from the longitudinal axis such that ions are injected orthogonal to the longitudinal axis into the RF potential of an ion guide. The ion guide may be an SRIG or ion funnel. The ion inlet 1410 may also be offset from a plane of the electrode 1415. For example, the ion inlet 1410 may be offset such that the ion inlet 1410 faces the electrode 1415 and ions are injected along a dimension parallel to a normal of the electrode 1415. One element may face another if its front is oriented towards the other element. An ion inlet facing an electrode may inject ions/molecules towards the electrode in the absence of an electromagnetic field.

The ion trajectory (and kinetic energy) can be adjusted via a combination of repeller electrodes 1415 and 1420, as is depicted in FIG. 14. The two electrodes 1420 and 1415 can thus induce minimal ion activation (a reduced-ion activation mode of operation), as shown in trajectory 1421, or significant activation via trajectory 1422, as discussed with reference to FIG. 5. In another example, the DC potential gradient may be varied to induce a non-ion-activation mode of operation. Likewise, the DC voltage applied to the repeller electrodes 1415, 1420 may be varied to switch between a transmitting and non-transmitting mode of operation.

Alternatively, instead of second repeller electrode 1415, the RF electrodes 1419 may be split to provide both an RF potential and a radial DC potential gradient, as described with reference to FIG. 11.

In yet another alternative, instead of two repeller electrodes 1415 and 1420, a single electrode at an angle, or a single electrode 1415 in combination with an axial DC potential gradient between the electrodes 1419 may provide the same control over the ion trajectory.

The methods described herein may be implemented with computer system configurations including hand-held devices, microprocessor systems, microprocessor-based or programmable consumer electronics, minicomputers, mainframe computers and the like. The embodiments can also be practiced in distributed computing environments, where tasks are performed by remote processing devices that are linked through a network.

Certain embodiments can also be embodied as computer-readable code on a non-transitory computer-readable medium. The computer readable medium is any data storage device than can store data, which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

Although embodiments according to the disclosure have been described with reference to particular types of devices and applications (particularly mass spectrometers) and the embodiments have particular advantages in such cases, as discussed herein, approaches according to the disclosure may be applied to other types of device and/or application. The specific calibration details of the ion guide/mass spectrometer arrangement, whilst potentially advantageous (especially in view of known calibration constraints and capabilities), may be varied significantly to arrive at devices with similar or identical operation. Each feature disclosed in this specification, unless stated otherwise, may be replaced by alternative features serving the same, equivalent or similar purpose. Thus, unless stated otherwise, each feature disclosed is one example only of a generic series of equivalent or similar features. All of the aspects and/or features disclosed in this specification may be combined in any combination, except combinations where at least some of such features and/or steps are mutually exclusive. In particular, the preferred features of the disclosure are applicable to all aspects and embodiments of the disclosure and may be used in any combination. Likewise, features described in non-essential combinations may be used separately (not in combination).

For instance, ion inlet 1210 of FIG. 12 may be provided at a non-zero angular offset (for instance, orthogonal) to the lengthwise axis of the first section 1201 and/or longitudinal axis of the second section 1202, and the first section 1201 may include at least one electrode 1415 facing the ion inlet 1210, as described with reference to FIG. 14. In another example, a DC repelling electrode may be provided facing the ion inlet in section 1301 as described with reference to FIG. 14 to provide additional control over the ion trajectory. In this example, electrodes 1316 in section 1301 may also be configured to produce an RF field. In yet a further example, ions may be injected into section 1301 at an angular offset (orthogonally, for example) as described with reference to FIG. 14. In this example, a DC repelling electrode may also be provided facing the ion inlet.

In yet another example, DC electrodes may be provided in section 1301 such that the ions are directed towards the RF field more than once. For example, a DC electrode may be positioned in section 1301 such that the ions are directed by the DC electrode towards the electrodes 1316 in the lower part of the first section 1301. A combined DC and RF field generated by the electrodes 1316 may then direct the ions towards the RF electrodes of the second section 1302. Thus, ion activation can be further increased by directing the ions towards the RF field more than once. In this example, the lower electrodes 1316 may be split ring electrodes or may have an increased DC potential compared to the upper electrodes 1316.

The methods and apparatus of the present disclosure can be utilised with a variety of electrode structures. Electrodes of appropriate dimensions can be arranged into symmetrical or asymmetrical patterns upon substrates and if elongation of electrodes is beneficial for a particular application, the electrodes may be linear or curving. Individual electrodes can be planar, hemispherical, rectangular or of other shapes. The electrodes may be PCB printed electrodes.

It will be appreciated that there is an implied "about" prior to temperatures, concentrations, times, pressures, flow rates, cross-sectional areas, voltages, currents, etc. discussed in the present teachings, such that slight and insubstantial deviations are within the scope of the present teachings. Furthermore, values referred to as being "equal" may in fact differ by less than a threshold amount. The threshold amount may be 5%, for example. The threshold may also be greater than 5% (for instance, 10%, 20% or 50%) or less than 5% (for example, 2% or 1%).

As used herein, including in the claims, unless the context indicates otherwise, singular forms of the terms herein are to be construed as including the plural form and vice versa. For instance, unless the context indicates otherwise, a singular reference herein including in the claims, such as "a" or "an" (such as an electrode) means "one or more" (for instance, one or more electrodes).

Throughout the description and claims of this disclosure, the words "comprise", "including", "having" and "contain" and variations of the words, for example "comprising" and "comprises" or similar, mean "including but not limited to", and are not intended to (and do not) exclude other components. Also, the use of "or" is inclusive, such that the phrase "A or B" is true when "A" is true, "B is true", or both "A" and "B" are true.

The use of any and all examples, or exemplary language ("for instance", "such as", "for example" and like language) provided herein, is intended merely to better illustrate the disclosure and does not indicate a limitation on the scope of the disclosure unless otherwise claimed. No language in the specification should be construed as indicating any non-claimed element as essential to the practice of the disclosure.

The terms "first" and "second" may be reversed without changing the scope of the invention. That is, an element termed a "first" element (for instance, a first section 101) may instead be termed a "second" element (for example, a second section 101) and an element termed a "second" element (for example, a second section 102) may instead be considered a "first" element (for instance, a first section 102).

Any steps described in this specification may be performed in any order or simultaneously unless stated or the context requires otherwise. Moreover, where a step is described as being performed after a step, this does not preclude intervening steps being performed.

It is also to be understood that, for any given component or embodiment described herein, any of the possible candidates or alternatives listed for that component may generally be used individually or in combination with one another, unless implicitly or explicitly understood or stated otherwise. It will be understood that any list of such candidates or alternatives is merely illustrative, not limiting, unless implicitly or explicitly understood or stated otherwise.

In this detailed description of the various embodiments, for the purposes of explanation, numerous specific details are set forth to provide a thorough understanding of the embodiments disclosed. One skilled in the art will appreciate, however, that these various embodiments may be practiced with or without these specific details. Furthermore, one skilled in the art can readily appreciate that the specific sequences in which methods are presented and performed are illustrative and it is contemplated that the sequences can be varied and still remain within the scope of the various embodiments disclosed herein.

All literature and similar materials cited in this application, including but not limited to patents, patent applications, articles, books, treaties and internet web pages are expressly incorporated by reference in their entirety for any purpose. Unless otherwise described, all technical and scientific terms used herein have a meaning as is commonly understood by one of ordinary skill in the art to which the various embodiments described herein belongs.

The invention claimed is:

1. A method for ion activation in an ion guide that comprises a first section and a second section, the second section having a longitudinal axis, the method comprising steps of:

receiving ions into the first section of the ion guide at a trajectory that is offset from the longitudinal axis;

applying a DC potential gradient in the first section along a dimension that is at a non-zero angle to the longitudinal axis to direct the ions towards the second section by providing a voltage for accelerating ions along the dimension to one or more electrodes in the first section or by providing a voltage for accelerating ions along the dimension and a voltage for decelerating ions along the dimension to two or more electrodes in the first section;

applying an RF field in the second section of the ion guide to confine the ions to the ion guide; and varying the DC potential gradient to switch between an ion-activation mode of operation and a reduced-or non-ion-activation mode of operation, by: (i) adjusting the voltage for accelerating ions along the dimension to be below a first threshold value in the reduced-or non-ion-activation mode of operation and to be above the first threshold value in the ion-activation mode of operation, and/or by (ii) adjusting the voltage for decelerating ions along the dimension to be above a second threshold value in the reduced-or non-ion-activation mode of operation and to be below the second threshold value in the ion-activation mode of operation;

wherein in the reduced-or non-ion-activation mode of operation the DC potential gradient causes the ions to pass along or close to the longitudinal axis of the second section; and wherein in the ion-activation mode of operation the DC potential gradient causes ion activation by changing, relative to the reduced-or non-ion-activation mode of operation, a location and direction of the ions as the ions enter the second section from the first section to cause the ions to pass in proximity to RF electrodes of the second section.

2. The method of claim 1, further comprising a step of applying a DC and/or RF field that at least partially cancels the DC potential gradient.

3. The method of claim 2 when an at least partially cancelling RF field is applied, wherein the at least partially cancelling RF field is the RF field of the second section.

4. The method of claim 1, wherein the trajectory is provided by receiving the ions from an ion inlet offset from the longitudinal axis, wherein the offset is a lateral and/or non-zero angular offset.

5. The method of claim 1, wherein the first and second sections are sections in a single ion funnel.

6. The method of claim 1, wherein the trajectory is provided by a displacement of a lengthwise axis of the first section from the longitudinal axis, wherein the displacement is a lateral and/or non-zero angular displacement.

7. The method of claim 1, wherein the ion guide comprises two distinct ion funnels or the first and second sections are sections of a conjoined ion funnel.

8. The method of claim 1, wherein the dimension is orthogonal to the longitudinal axis.

9. The method of claim 1, further comprising a step of varying the DC potential gradient to switch between a transmitting mode of operation of a mass spectrometer (MS), in which the ions exiting the ion guide are transmitted into a downstream part of the MS, and a non-transmitting mode of operation, in which the ions are prevented from reaching the downstream part, by: (i) adjusting the voltage for accelerating ions along the dimension to be below a third threshold value in the non-transmitting mode of operation and to be above the third threshold value in the transmitting mode of operation, and/or by (ii) adjusting the voltage for decelerating ions along the dimension to be above a fourth threshold value in the non-transmitting mode of operation and to be below the fourth threshold value in the transmitting mode of operation.

10. The method of claim 1, wherein the two or more electrodes in the first section comprises one or more electrodes provided with the voltage for accelerating ions and one or more electrodes provided with the voltage for decelerating ions, and the step of adjusting the voltage for decelerating ions comprises varying the voltage for decelerating ions as a function of the voltage for accelerating ions.

11. The method of claim 1, further comprising adjusting the voltage for accelerating ions along the dimension to be below a fifth threshold value in the ion-activation mode of operation, and/or adjusting the voltage for decelerating ions along the dimension to be above a sixth threshold value in the ion-activation mode of operation.

12. The method of claim 1, wherein applying the DC potential gradient comprises applying a constant or pulsed DC potential gradient.

13. The method of claim 1, wherein at least one of the first and second sections comprises one or more annular electrodes and/or one or more electrodes having a non-closed shape.

14. The method of claim 13, wherein the one or more annular electrodes comprise two or more segments and the step of applying the DC potential gradient comprises applying a DC voltage across the two or more segments.

15. The method of claim 1, wherein the first and/or second section comprises a stacked ring ion guide and the stacked ring ion guide is at least partially comprised of electrodes having a non-closed shape.

16. The method of claim 15, wherein the non-closed shapes are half-rings or U-shapes.

17. The method of claim 9, further comprising adjusting the voltage for accelerating ions along the dimension to be below a seventh threshold value in the transmitting mode of operation, and/or adjusting the voltage for decelerating ions along the dimension to be above an eighth threshold value in the transmitting mode of operation.

18. A system comprising:

a mass spectrometer arrangement; and a controller configured to operate the mass spectrometer such that:

ions are received into a first section of an ion guide at a trajectory that is offset from a longitudinal axis;

a DC potential gradient is established in the first section along a dimension that is at a non-zero angle to the longitudinal axis to direct the ions towards a second section of the ion guide by providing a voltage for accelerating ions along the dimension to one or more electrodes in the first section or by providing a voltage for accelerating ions along the dimension and a voltage for decelerating ions along the dimension to two or more electrodes in the first section; and an RF field is applied in the second section of the ion guide to confine the ions to the ion guide;

wherein the DC potential gradient is varied to switch between an ion-activation mode of operation and a reduced-or non-ion-activation mode of operation, by: (i) adjusting the voltage for accelerating ions along the dimension to be below a first threshold value in the reduced-or non-ion-activation mode of operation and to be above the first threshold value in the ion-activation mode of operation, and/or by (ii) adjusting the voltage for decelerating ions along the dimension to be above a second threshold value in the reduced-or non-ion-activation mode of operation and to be below the second threshold value in the ion-activation mode of operation;

wherein in the reduced-or non-ion-activation mode of operation the DC potential gradient causes the ions to pass along or close to the longitudinal axis of the second section; and wherein in the ion-activation mode of operation the DC potential gradient causes ion activation by changing, relative to the reduced-or non-ion-activation mode of operation, a location and direction of the ions as the ions enter the second section from the first section to cause the ions to pass in proximity to RF electrodes of the second section.

19. A computer-readable medium comprising computer-executable instructions that, when executed, cause a computing device operating a mass spectrometer to perform steps, comprising:

receiving ions into a first section of an ion guide at a trajectory that is offset from a longitudinal axis;

establishing a DC potential gradient in the first section along a dimension that is at a non-zero angle to the longitudinal axis to direct the ions towards a second section of the ion guide by providing a voltage for accelerating ions along the dimension to one or more electrodes in the first section or by providing a voltage for accelerating ions along the dimension and a voltage for decelerating ions along the dimension to two or more electrodes in the first section;

applying an RF field in the second section of the ion guide to confine the ions to the ion guide; and varying the DC potential gradient to switch between an ion-activation mode of operation and a reduced-or non-ion-activation mode of operation, by: (i) adjusting the voltage for accelerating ions along the dimension to be below a first threshold value in the reduced-or non-ion-activation mode of operation and to be above the first threshold value in the ion-activation mode of operation, and/or by (ii) adjusting the voltage for decelerating ions along the dimension to be above a second threshold value in the reduced-or non-ion-activation mode of operation and to be below the second threshold value in the ion-activation mode of operation;

wherein in the reduced-or non-ion-activation mode of operation the DC potential gradient causes the ions to pass along or close to the longitudinal axis of the second section; and wherein in the ion-activation mode of operation the DC potential gradient causes ion activation by changing, relative to the reduced-or non-ion-activation mode of operation, a location and direction of the ions as the ions enter the second section from the first section to cause the ions to pass in proximity to RF electrodes of the second section.

20. An ion guide comprising a first section and a second section, the second section having a longitudinal axis, the first section comprising:

an ion inlet, offset from the longitudinal axis; and one or more electrodes configured to produce a DC potential gradient along a dimension that is at a non-zero angle to the longitudinal axis when a voltage for accelerating ions along the dimension is provided to one or more of the electrodes or when a voltage for accelerating ions along the dimension and a voltage for decelerating ions along the dimension are provided to two or more of the electrodes, the DC potential gradient directing ions towards the second section; and the second section comprising electrodes configured to produce an RF field that confines the ions from the first section to the ion guide, wherein the ion guide is configured to vary the DC potential gradient to switch between an ion-activation mode of operation and a reduced-or non-ion-activation mode of operation, by: (i) adjusting the voltage for accelerating ions along the dimension to be below a first threshold value in the reduced-or non-ion-activation mode of operation and to be above the first threshold value in the ion-activation mode of operation, and/or by (ii) adjusting the voltage for decelerating ions along the dimension to be above a second threshold value in the reduced-or non-ion-activation mode of operation and to be below the second threshold value in the ion-activation mode of operation;

wherein in the reduced-or non-ion-activation mode of operation the DC potential gradient causes the ions to pass along or close to the longitudinal axis of the second section; and wherein in the ion-activation mode of operation the DC potential gradient causes ion activation by changing, relative to the reduced-or non-ion-activation mode of operation, a location and direction of the ions as the ions enter the second section from the first section to cause the ions to pass in proximity to RF electrodes in the second section.

21. The ion guide of claim 20, wherein the ion guide is configured to:

receive ions into the first section of the ion guide at a trajectory that is offset from the longitudinal axis;

establish the DC potential gradient in the first section along the dimension to direct the ions towards the second section of the ion guide; and apply the RF field in the second section of the ion guide to confine the ions to the ion guide.

* * * * *